United States Patent
Hosseini et al.

(10) Patent No.: US 11,019,667 B2
(45) Date of Patent: May 25, 2021

(54) UPLINK COLLISION HANDLING

(71) Applicant: QUALCOMM incorporated, San Diego, CA (US)

(72) Inventors: Seyedkianoush Hosseini, San Diego, CA (US); Yi Huang, San Diego, CA (US); Linhai He, San Diego, CA (US); Chih-Ping Li, San Diego, CA (US); Peter Gaal, San Diego, CA (US); Wanshi Chen, San Diego, CA (US); Jing Jiang, San Diego, CA (US); Xiao Feng Wang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 16/534,180

(22) Filed: Aug. 7, 2019

(65) Prior Publication Data

US 2020/0053801 A1 Feb. 13, 2020

Related U.S. Application Data

(60) Provisional application No. 62/716,849, filed on Aug. 9, 2018.

(51) Int. Cl.
*H04W 74/08* (2009.01)
*H04W 72/10* (2009.01)
(Continued)

(52) U.S. Cl.
CPC ....... *H04W 74/0841* (2013.01); *H04L 1/1812* (2013.01); *H04W 52/367* (2013.01);
(Continued)

(58) Field of Classification Search
CPC ......... H04W 72/1268; H04W 74/0833; H04W 76/27; H04W 72/1284; H04W 76/10;
(Continued)

(56) References Cited

U.S. PATENT DOCUMENTS

2018/0110042 A1 4/2018 Chen et al.
2019/0165894 A1* 5/2019 Choi .................... H04L 5/0055
(Continued)

FOREIGN PATENT DOCUMENTS

WO WO-2015139032 A1 9/2015

OTHER PUBLICATIONS

Institute for Information Industry (III): "Intra-UE UL Multiplexing with Different Reliability Requirements", 3GPP Draft; R1-1807140 INTRA-UE UL Multiplexing With Different Reliability Requirements, 3rd Generation Partnership Project (3GPP), Mobile Competence Centre; 650, Route des Lucioles ; F-06921 Sophia, vol. RAN WG1, No. Busan, Korea; 20180521-20180525, May 20, 2018, XP051442338, 4 Pages, Retrieved from the Internet< URL:< url: http://www.3gpp.org/ftp/Meetings%5F3GPP%5FSYNC/RAN1/Docs/ [retrieved on May 20, 2018] section 2.</url:>.
(Continued)

*Primary Examiner* — Jung Liu
(74) *Attorney, Agent, or Firm* — Qualcomm Incorporated

(57) ABSTRACT

Techniques are described herein for collision handling in uplink transmissions. A user equipment (UE) may have more information to transmit during an uplink transmission than the allocated resources can handle. The UE may identify that an uplink transmission includes a plurality of different channels. The UE may exclude service types or scale the transmit power of service types based on performing a prioritization of the different channels in the uplink transmission. In some cases, the UE may prioritize ultra-reliable low-latency communications (URLLC) service (Continued)

types over enhanced mobile broadband (eMBB) service types. In some cases, the content of the URLLC service types and the content of the eMBB service types may be considered when prioritizing. The UE may be capable of configuring different sets of priority rules based on reliability thresholds and latency thresholds associated with the service types.

28 Claims, 13 Drawing Sheets

(51) Int. Cl.
  *H04W 72/04* (2009.01)
  *H04W 52/36* (2009.01)
  *H04W 72/08* (2009.01)
  *H04L 1/18* (2006.01)

(52) U.S. Cl.
  CPC ..... *H04W 72/0413* (2013.01); *H04W 72/085* (2013.01); *H04W 72/10* (2013.01)

(58) Field of Classification Search
  CPC ......... H04W 56/0045; H04W 72/1289; H04W 72/0446; Y02D 70/00; Y02D 70/10; Y02D 70/12; Y02D 70/126; H04L 5/0053; H04L 1/00; H04L 1/0025; H04L 5/0044
  See application file for complete search history.

(56) References Cited

U.S. PATENT DOCUMENTS

| | | | |
|---|---|---|---|
| 2019/0207662 A1* | 7/2019 | Zhou | H04W 72/042 |
| 2019/0363843 A1* | 11/2019 | Gordaychik | H04W 72/042 |
| 2019/0364492 A1* | 11/2019 | Azizi | H04W 52/0264 |
| 2020/0037345 A1* | 1/2020 | Ryoo | H04W 76/27 |
| 2020/0186313 A1* | 6/2020 | Wong | H04L 1/0025 |

OTHER PUBLICATIONS

Interdigital et al: "Transmission of UCI with Different Reliability Requirements", 3GPP Draft; R1-1804677 (R15 NR WI AI 725 UL Multiplexing), 3RD Generation Partnership Project (3GPP), Mobile Competence Centre; 650, Route des Lucioles; F-06921 Sophia-Antipolis Cedex; France, vol. RAN WG1, No. Sanya, China; 20180416-20180420, Apr. 15, 2018, XP051426944, 4 Pages, Retrieved from the Internet< URL :< url :="" http://www.3gpp.org/ftp/Meetings%5F3GPP%5FSYNC/RAN1/Docs/ [retrieved on Apr. 15, 2018] sections 1 and 2.2 to 2.4</url>.

Mediatek Inc (Email Rapporteur): "Email Discussion [101bis#73] [NR UP] Parallel SR and RACH," 3GPP Draft; R2-1807264 Report of Email Discussion [101BIS#73] [NR UP] Parallel SR and RACH, 3rd Generation Partnership Project (3GPP), Mobile Competence Centre; 650, Route des Lucioles; F-06921 Sophia, vol. RAN WG2, No. Busan, Korea; 20180521-20180525, May 20, 2018, XP051443673, 16 Pages, Retrieved from the Internet: URL: http://www.3gpp.org/ftp/Meetings%5F3GPP%5FSYNC/RAN2/Docs/ [retrieved on May 20, 2018] section 2.

Partial International Search Report—PCT/US2019/045692—ISA/EPO—Oct. 17, 2019.

Vivo: "Discussion on Handling UL Multiplexing of Transmissions with Different Reliability Requirements", 3GPP Draft; R1-1803848_Discussion on Handling UL Multiplexing of Transmissions With Different Reliability Requirements, 3rd Generation Partnership Project (3GPP), Mobile Competence Centre; 650, Route , vol. RAN WG1, No. Sanya, China; 20180416-20180420, Apr. 15, 2018, XP051426143, 10 Pages, Retrieved from the Internet< URL:< url: http://www.3gpp.org/ftp/Meetings%5F3GPP%5FSYNC/RAN1/Docs/ [retrieved on Apr. 15, 2018] sections 1, 2 and 2.2</url:>.

Vivo: "Remaining Issues on UL Data Transmission for URLLC", 3GPP Draft; R1-1806070 Remaining Issues on UL Data Transmission for URLLC, 3rd Generation Partnership Project (3GPP), Mobile Competence Centre; 650, Route des Lucioles; F-06921 Sophia-Antipolis Cedex, vol. RAN WG1, No. Busan, Korea; 20180521-20180525, May 20, 2018, XP051441284, 5 Pages, Retrieved from the Internet< URL:< url: http://www.3gpp.org/ftp/Meetings%5F3GPP%5FSYNC/RAN1/Docs/ [retrieved on May 20, 2018] sections 2.2 and 2.3</url:>.

International Search Report and Written Opinion—PCT/US2019/045692—ISA/EPO —dated Dec. 2, 2019.

* cited by examiner

UPLINK COLLISION HANDLING

CROSS REFERENCE

The present Application for Patent claims the benefit of U.S. Provisional Patent Application No. 62/716,849 by HOSSEINI et al., entitled "UPLINK COLLISION HANDLING," filed Aug. 9, 2018, assigned to the assignee hereof, and expressly incorporated by reference in its entirety herein.

BACKGROUND

The following relates generally to wireless communications, and more specifically to uplink collision handling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communication systems, a UE may use priority rules to drop channels or services types or scale the transmit power of channels or service types of a transmission. This may occur, in some cases, when a power (e.g., a total power) of the uplink transmission exceeds a threshold output power of the uplink transmission. Improved techniques for dropping or scaling of services types or channels are desired.

SUMMARY

The described techniques relate to improved methods, systems, devices, and apparatuses that support uplink collision handling. A first device, such as a user equipment (UE), may have more information to transmit during an uplink transmission than the allocated resources can handle. The UE may, in some cases, exclude one or more service types or channels or scale a transmit power of one or more service types or channels based on performing a prioritization of one, multiple, or all of the different service types or channels in the uplink transmission. Among other examples, the UE may prioritize ultra-reliable low-latency communications (URLLC) service types or channels over enhanced mobile broadband (eMBB) service types or channel. In some cases, content of the URLLC service types or channels and/or content of the eMBB service types or channels may be considered when prioritizing. The UE may be capable of configuring different sets of priority rules based on reliability thresholds and latency thresholds associated with one or more service types or channels.

A method for wireless communication is described. The method may include identifying that an uplink transmission includes a first channel associated with a first reliability threshold and a first latency threshold and a second channel associated with a second reliability threshold and a second latency threshold, determining that the first channel and the second channel are scheduled to collide during the uplink transmission, prioritizing the second channel based on determining that the first channel and the second channel are scheduled to collide during the uplink transmission, the first reliability threshold, the second reliability threshold, the first latency threshold, and the second latency threshold, and transmitting the uplink transmission.

An apparatus for wireless communication is described. The apparatus may include a processor, memory in electronic communication with the processor, and instructions stored in the memory. The instructions may be executable by the processor to cause the apparatus to identify that an uplink transmission includes a first channel associated with a first reliability threshold and a first latency threshold and a second channel associated with a second reliability threshold and a second latency threshold, determine that the first channel and the second channel are scheduled to collide during the uplink transmission, prioritize the second channel based on determining that the first channel and the second channel are scheduled to collide during the uplink transmission, the first reliability threshold, the second reliability threshold, the first latency threshold, and the second latency threshold, and transmit the uplink transmission.

Another apparatus for wireless communication is described. The apparatus may include means for identifying that an uplink transmission includes a first channel associated with a first reliability threshold and a first latency threshold and a second channel associated with a second reliability threshold and a second latency threshold, means for determining that the first channel and the second channel are scheduled to collide during the uplink transmission, means for prioritizing the second channel based on determining that the first channel and the second channel are scheduled to collide during the uplink transmission, the first reliability threshold, the second reliability threshold, the first latency threshold, and the second latency threshold, and means for transmitting the uplink transmission.

A non-transitory computer-readable medium storing code for wireless communication is described. The code may include instructions executable by a processor to identify that an uplink transmission includes a first channel associated with a first reliability threshold and a first latency threshold and a second channel associated with a second reliability threshold and a second latency threshold, determine that the first channel and the second channel are scheduled to collide during the uplink transmission, prioritize the second channel based on determining that the first channel and the second channel are scheduled to collide during the uplink transmission, the first reliability threshold, the second reliability threshold, the first latency threshold, and the second latency threshold, and transmit the uplink transmission.

Some examples of the method, apparatuses, and non-transitory computer-readable medium described herein may further include operations, features, means, or instructions for determining that a transmit power of the uplink transmission exceeds a threshold output power of a UE, where determining that the first channel and the second channel may be scheduled to collide may be based on determining that the transmit power exceeds the threshold output power.

Some examples of the method, apparatuses, and non-transitory computer-readable medium described herein may further include operations, features, means, or instructions for determining that the first channel and the second channel occur on one or more intra-band contiguous component carriers, where prioritizing the second channel may be based on determining that the first channel and the second channel occur on the one or more intra-band contiguous component carriers.

Some examples of the method, apparatuses, and non-transitory computer-readable medium described herein may further include operations, features, means, or instructions for configuring a set of priority rules to indicate whether the first channel may have a lower priority than the second channel or the second channel may have a lower priority than the first channel, where prioritizing the second channel may be based on the set of priority rules.

In some examples of the method, apparatuses, and non-transitory computer-readable medium described herein, the first channel includes an enhanced mobile broadband (eMBB) channel and the second channel includes an URLLC channel.

Some examples of the method, apparatuses, and non-transitory computer-readable medium described herein may further include operations, features, means, or instructions for excluding at least a portion of the first channel from the uplink transmission based on prioritizing the second channel, where transmitting the uplink transmission may be based on excluding the portion of the first channel.

Some examples of the method, apparatuses, and non-transitory computer-readable medium described herein may further include operations, features, means, or instructions for scaling a transmit power associated with at least a portion of the first channel based on prioritizing the second channel, where transmitting the uplink transmission may be based on scaling the transmit power associated with the portion of the first channel.

Some examples of the method, apparatuses, and non-transitory computer-readable medium described herein may further include operations, features, means, or instructions for determining to exclude or scale a transmit power of the first channel in the uplink transmission based on the prioritizing, where transmitting the uplink transmission may be based on determining to exclude or scale the transmit power of the first channel.

Some examples of the method, apparatuses, and non-transitory computer-readable medium described herein may further include operations, features, means, or instructions for prioritizing the second channel over the first channel based on the uplink transmission including both the second channel and the first channel, where prioritizing the second channel may be based on prioritizing the second channel over the first channel.

Some examples of the method, apparatuses, and non-transitory computer-readable medium described herein may further include operations, features, means, or instructions for ranking priority all second channels of the uplink transmission may be prioritized over all first channels of the uplink transmission.

Some examples of the method, apparatuses, and non-transitory computer-readable medium described herein may further include operations, features, means, or instructions for determining a first content of the first channel and a second content of the second channel, where prioritizing the second channel may be based on determining the first content and the second content.

Some examples of the method, apparatuses, and non-transitory computer-readable medium described herein may further include operations, features, means, or instructions for prioritizing the first channel over the second channel based on determining the first content and the second content, where prioritizing the second channel may be based on prioritizing the first channel over the second channel.

Some examples of the method, apparatuses, and non-transitory computer-readable medium described herein may further include operations, features, means, or instructions for determining that the first channel includes a hybrid automatic repeat request (HARQ) acknowledgment (ACK) or negative ACK (NACK), and prioritizing the first channel over the second channel based on determining that the first channel includes HARQ ACK or NACK, where prioritizing the second channel may be based on prioritizing the first channel over the second channel.

Some examples of the method, apparatuses, and non-transitory computer-readable medium described herein may further include operations, features, means, or instructions for determining that the second channel does not include HARQ ACK or NACK, where prioritizing the first channel over the second channel may be based on determining that the second channel does not include HARQ ACK or NACK.

Some examples of the method, apparatuses, and non-transitory computer-readable medium described herein may further include operations, features, means, or instructions for identifying that the uplink transmission includes a physical random access channel (PRACH), and prioritizing the PRACH over the second channel and the first channel, where prioritizing the second channel may be based on prioritizing the PRACH over the second channel and the first channel.

In some examples of the method, apparatuses, and non-transitory computer-readable medium described herein, the PRACH collides with the second channel and the first channel when a scheduling request for a logical channel may be not configured with physical uplink control channel (PUCCH) resources or beam failure recovery.

Some examples of the method, apparatuses, and non-transitory computer-readable medium described herein may further include operations, features, means, or instructions for identifying that the uplink transmission includes the PRACH on a secondary cell, and prioritizing the second channel over the PRACH on the secondary cell, where prioritizing the second channel may be based on prioritizing the second channel over the PRACH.

Some examples of the method, apparatuses, and non-transitory computer-readable medium described herein may further include operations, features, means, or instructions for identifying that the uplink transmission includes a physical random access channel (PRACH), and prioritizing the second channel over the PRACH and the PRACH over the first channel, where prioritizing the second channel may be based on prioritizing the second channel over the PRACH and the PRACH over the first channel.

Some examples of the method, apparatuses, and non-transitory computer-readable medium described herein may further include operations, features, means, or instructions for determining that the first reliability threshold, the second reliability threshold, the first latency threshold, the second latency threshold, or a combination thereof satisfy a criterion, and configuring a UE with a set of prioritization rules based on based on the determining that the first reliability threshold, the second reliability threshold, the first latency threshold, the second latency threshold, or the combination thereof satisfy the criterion, where prioritizing the second channel may be based on configuring the UE with the set of prioritization rules.

Some examples of the method, apparatuses, and non-transitory computer-readable medium described herein may further include operations, features, means, or instructions for identifying that the uplink transmission includes a set of different PUCCH groups, and prioritizing a primary PUCCH group over a secondary PUCCH group, where prioritizing the second channel may be based on prioritizing the primary PUCCH group over the secondary PUCCH group.

Some examples of the method, apparatuses, and non-transitory computer-readable medium described herein may further include operations, features, means, or instructions for determining that a transmit power of the uplink transmission exceeds a threshold output power of a UE, where the threshold output power of the UE may be a configured maximum output power.

In some examples of the method, apparatuses, and non-transitory computer-readable medium described herein, the first channel includes an eMBB channel and the second channel includes an URLLC channel.

A method for wireless communication is described. The method may include identifying a first quantity of channels a UE is capable of transmitting concurrently, identifying a second quantity of channels associated with an uplink transmission of the UE, determining that the second quantity of channels associated with the uplink transmission exceeds the first quantity of channels, excluding at least one channel associated with the uplink transmission based on determining that the second quantity of channels associated with the uplink transmission exceeds the first quantity of channels, and transmitting the uplink transmission based on excluding the at least one channel of the uplink transmission.

An apparatus for wireless communication is described. The apparatus may include a processor, memory in electronic communication with the processor, and instructions stored in the memory. The instructions may be executable by the processor to cause the apparatus to identify a first quantity of channels a UE is capable of transmitting concurrently, identify a second quantity of channels associated with an uplink transmission of the UE, determine that the second quantity of channels associated with the uplink transmission exceeds the first quantity of channels, exclude at least one channel associated with the uplink transmission based on determining that the second quantity of channels associated with the uplink transmission exceeds the first quantity of channels, and transmit the uplink transmission based on excluding the at least one channel of the uplink transmission.

Another apparatus for wireless communication is described. The apparatus may include means for identifying a first quantity of channels a UE is capable of transmitting concurrently, means for identifying a second quantity of channels associated with an uplink transmission of the UE, means for determining that the second quantity of channels associated with the uplink transmission exceeds the first quantity of channels, means for excluding at least one channel associated with the uplink transmission based on determining that the second quantity of channels associated with the uplink transmission exceeds the first quantity of channels, and means for transmitting the uplink transmission based on excluding the at least one channel of the uplink transmission.

A non-transitory computer-readable medium storing code for wireless communication is described. The code may include instructions executable by a processor to identify a first quantity of channels a UE is capable of transmitting concurrently, identify a second quantity of channels associated with an uplink transmission of the UE, determine that the second quantity of channels associated with the uplink transmission exceeds the first quantity of channels, exclude at least one channel associated with the uplink transmission based on determining that the second quantity of channels associated with the uplink transmission exceeds the first quantity of channels, and transmit the uplink transmission based on excluding the at least one channel of the uplink transmission.

Some examples of the method, apparatuses, and non-transitory computer-readable medium described herein may further include operations, features, means, or instructions for identifying that the second quantity of channels of the uplink transmission includes a first service type and a second service type that may be associated with a reliability threshold and a latency threshold, and prioritizing the second quantity of channels of the uplink transmission based on the uplink transmission including the second service type, where excluding the at least one channel may be based on prioritizing the second quantity of channels.

In some examples of the method, apparatuses, and non-transitory computer-readable medium described herein, the first quantity of channels and the second quantity of channels may be identified for each PUCCH group associated with the UE.

In some examples of the method, apparatuses, and non-transitory computer-readable medium described herein, the first quantity of channels may be defined across all uplink carriers associated with the UE.

Some examples of the method, apparatuses, and non-transitory computer-readable medium described herein may further include operations, features, means, or instructions for prioritizing a second service type of the uplink transmission that may be associated with a reliability threshold and a latency threshold over a first service type, where excluding the at least one channel may be based on prioritizing the second service type over the first service type.

Some examples of the method, apparatuses, and non-transitory computer-readable medium described herein may further include operations, features, means, or instructions for determining that a first service type includes a HARQ ACK or NACK, and prioritizing the first service type over a second service type that may be associated with a reliability threshold and a latency threshold based on determining that the first service type includes HARQ ACK/NACK, where excluding the at least one channel may be based on prioritizing the first service type over the second service type.

DETAILED DESCRIPTION

In some wireless communication systems, a user equipment (UE) may use priority rules to drop one or more channels or one or more services types or scale the power of one or more channels or one or more service types when a power, such as a total power, of an uplink transmission exceeds a threshold, such as the threshold output power of the uplink transmission. In some cases, however, the priority rules used by the UE may not account for differences between different service types, such as differences between enhanced mobile broadband (eMBB) service types and ultra-reliable low-latency communications (URLLC) service types. In such cases, the UE may treat eMBB channels and URLLC channels the same when prioritizing channels or service types of one or more uplink transmissions. This may cause URLLC traffic to be dropped or to have the transmit power scaled back. If this occurs, the URLLC traffic may not meet the reliability threshold or the latency threshold associated with the URLLC traffic, which may lead to additional inefficiencies and problems based on conditions.

Techniques are described herein for priority rules that account for service types, such as eMBB service types or channels and URLLC service types or channels, when scaling the transmit power of one or more uplink transmissions or dropping portions of one or more uplink transmissions. In some cases, all service types or channels of one variety (e.g., URLLC service types) may be prioritized over service types or channels of another variety (e.g., eMBB service types). In some cases, content of at least one, if not multiple, service types or channels (e.g., URLLC service types, eMBB service types) may be considered when prioritizing. A UE may be capable of configuring different sets of priority rules based on the reliability thresholds and/or the latency thresholds associated with one or more service types or channels. In some examples, the UE may be configured to prioritize a physical random access channel (PRACH) on a primary cell over other channels and/or service types.

Aspects of the disclosure are initially described in the context of wireless communications systems. Aspects of the disclosure are also described in the context of process flows. Aspects of the disclosure are further illustrated by and described with reference to apparatus diagrams, system diagrams, and flowcharts that relate to uplink collision handling.

Figure 1:
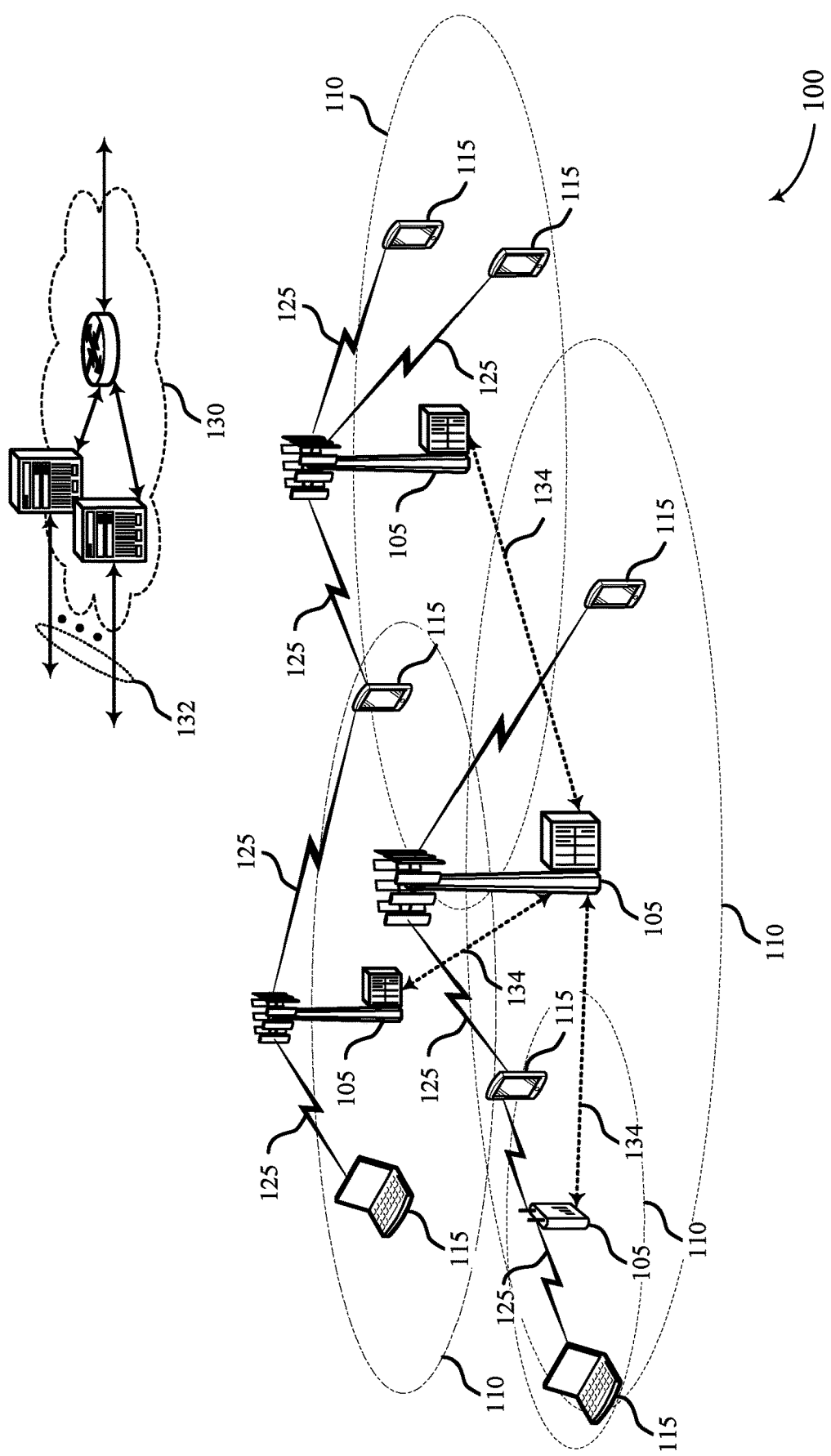
FIG. 1 illustrates an example of a system for wireless communications that supports uplink collision handling in accordance with aspects of the present disclosure.

FIG. 1 illustrates an example of a wireless communications system 100 that supports uplink collision handling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low-latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers and one or more uplink component carriers s according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, a UE 115 may have more information to transmit during an uplink transmission than allocated resources can handle. The UE 115 may exclude service types or scale the transmit power of service types based on performing a prioritization of at least one of the different service types or channels in the uplink transmission. In some cases, the UE 115 may prioritize URLLC service types over eMBB service types. In some cases, the content of the URLLC service types and the content of the eMBB service types may be considered when prioritizing. The UE 115 may be capable of configuring different sets of priority rules based on reliability thresholds and latency thresholds associated with at least one of, if not multiple, the service types or channels.

Figure 2:
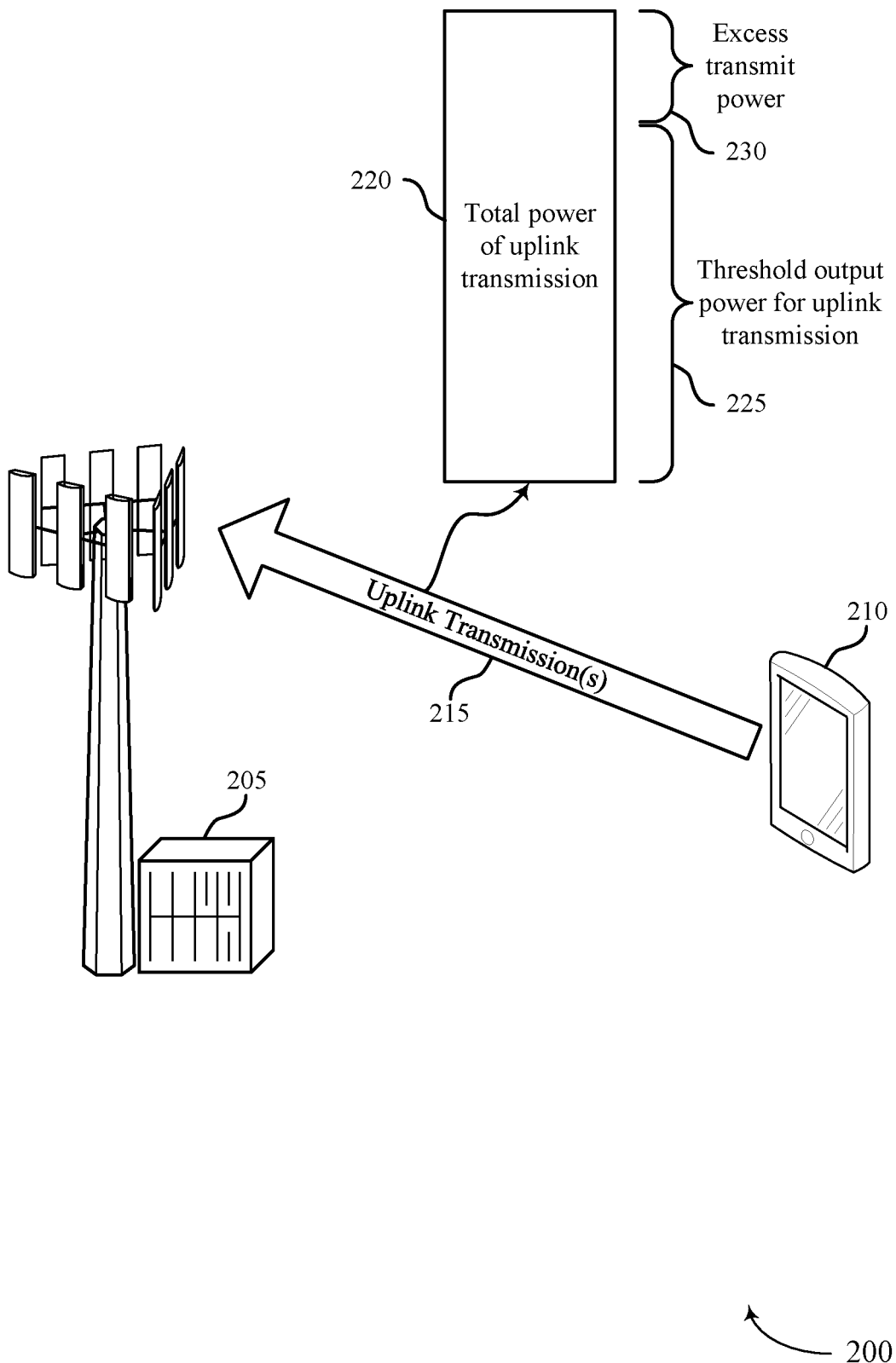
FIG. 2 illustrates an example of a wireless communication system that supports uplink collision handling in accordance with aspects of the present disclosure.

FIG. 2 illustrates an example of a wireless communications system 200 that supports uplink collision handling in accordance with aspects of the present disclosure. In some examples, the wireless communications system 200 may implement aspects of the wireless communications system 100. The wireless communications system 200 may include one or more base stations 205 and one or more UEs 210. The one or more base stations 205 may be examples of the base stations 105 described with reference to FIG. 1. The one or more UEs 210 may be examples of the UEs 115 described with reference to FIG. 1.

The base station 205 may allocate resources to the UE 210 to be used by the UE 210 to transmit uplink transmissions 215. The base station 205 may inform the UE 210 about the allocated resources (e.g., through a message). Using the information (e.g., from the message,) the base station 205 may assign a total transmit power (e.g., threshold output power 225) to the UE 210 for the scheduled transmission. In some cases, the threshold output power 225 may be a configured maximum output power of the uplink transmission 215 (e.g., Pcmax). In some cases, the base station 205 may indicate an upper bound for the configured maximum output power and a lower bound for the configured maximum output power in the message. In such cases, the UE 210 may select the configured maximum output power from a value between the upper bound and the lower bound.

Parallel transmissions using the same allocated resources may be permitted in the wireless communications systems. As such, different channels (e.g., PRACH, eMBB channels, and/or URLLC channels) may be scheduled or attempting to use the same allocated resources and the same configured threshold output power associated with the allocated resources. In such cases, the total power 220 assigned by the UE 210 to these different channels may exceed the threshold output power 225. Thus, the UE 210 may be attempting to transmit with more power than is allotted and the uplink transmission 215 may have some excess transmit power 230 associated with it. When these conditions exist, the various channels of the uplink transmission 215 may be said to collide or that there is a collision in the uplink transmission 215.

The UE 210 may use priority rules to drop one or more channels or one or more services types or scale the power of one or more channels or one or more service types (e.g., when the total power of the uplink transmission 215 exceeds the threshold output power 225 of the uplink transmission 215). In some cases, however, the priority rules used by the UE 210 may not account for differences between different types of traffic, such as eMBB traffic and URLLC traffic. In such cases, the UE 210 may treat different channels, such as eMBB channels and URLLC channels, the same when prioritizing channels or service types of the uplink transmission 215. This may cause URLLC traffic to be dropped or to have the transmit power scaled back. If this occurs, the URLLC may not meet the reliability threshold or the latency threshold associated with the URLLC traffic.

In some cases, the UE 210 may indicate that it is not capable of simultaneous transmission of the various channels of the uplink transmission 215 and a collision may occur in the uplink transmission 215 in a CC or over intra-band contiguous component carriers or in band of a band combinations (BOBCs). The UE 210 may use priority rules to drop one or more channels with a lower priority based on the priority rules. In some cases, the UE, 210 may indicate that it is capable of simultaneous transmission of the various channels of the uplink transmission 215 and a collision may occur in the uplink transmission 215 over intra-band contiguous component carriers or inter-band component carriers or in BOBCs. The UE 210 may use priority rules to drop one or more channels with a lower priority based on the priority rules or the UE 210 may scale the power of one or more channels.

Techniques are described herein for priority rules that account for different service types, such as eMBB and URLLC, when scaling the transmit power of uplink transmission 215 or dropping portions of the uplink transmission 215. In some cases, all URLLC service types may be prioritized over eMBB service types. In some cases, the content of the URLLC service types and the content of the eMBB service types may be considered when prioritizing. A UE 210 may be capable of configuring different sets of priority rules based on the reliability thresholds and the latency thresholds associated with the service types. The UE 210 may be configured to prioritize PRACH, including, but not limited to, prioritizing PRACH on the primary cell over at least some, if not all, other channels and service types.

Figure 3:
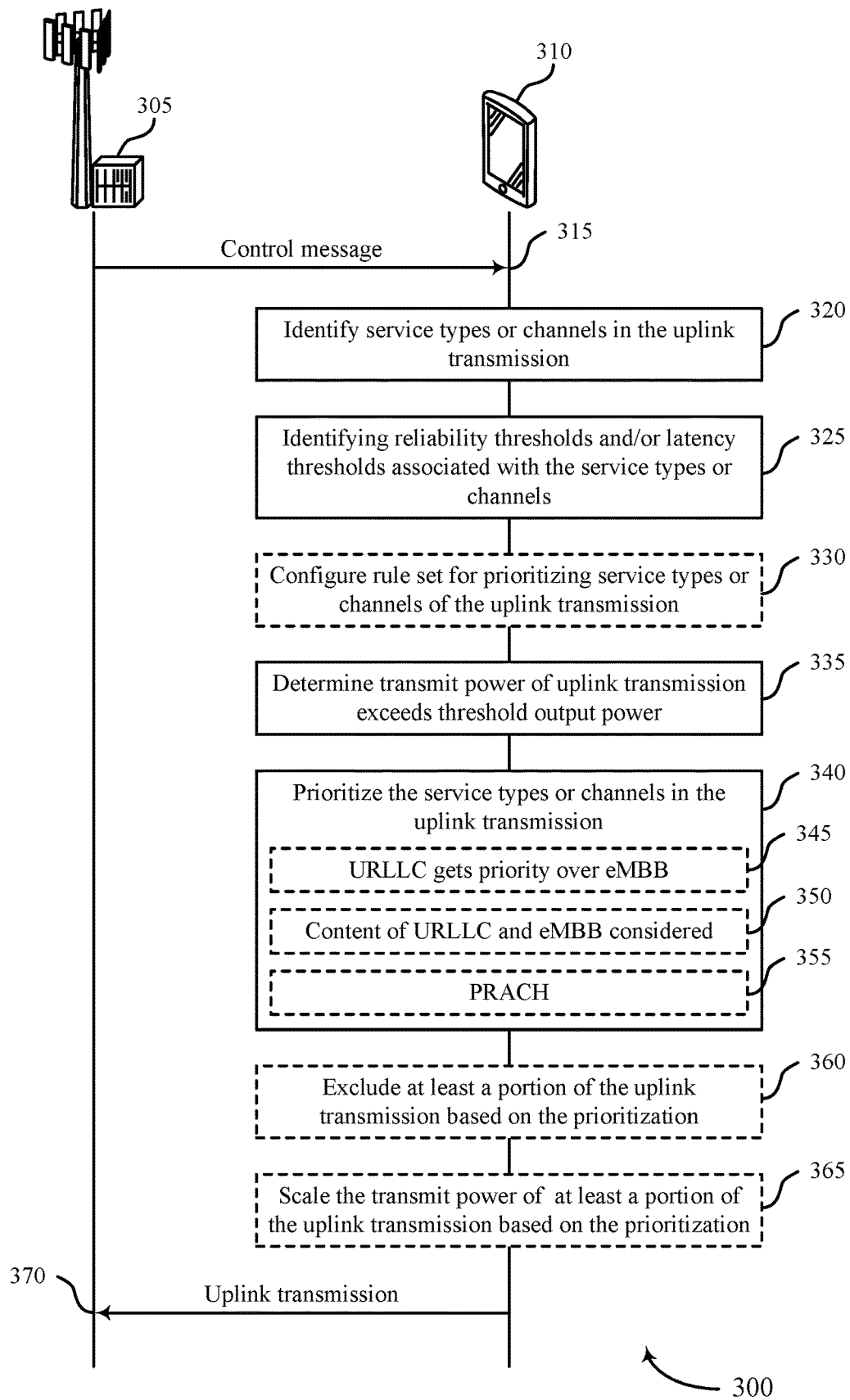
FIG. 3 illustrates an example of a process flow that supports uplink collision handling in accordance with aspects of the present disclosure.

FIG. 3 illustrates an example of a process flow 300 that supports uplink collision handling in accordance with aspects of the present disclosure. In some examples, the process flow 300 may implement aspects of wireless communications systems 100 or 200. The process flow 300 may illustrate prioritization procedures configured to prioritize traffic of an uplink transmission 370 and scale the power of the uplink transmission 370 or drop portions of the uplink transmission 370 based on the prioritization. The process flow 300 may illustrate functions performed by and signals exchanged between a base station 305 and a UE 310. The base station 305 may be an example of the base stations 105 and 205 described with reference to FIGS. 1 and 2. The UE 310 may be an example of the UEs 115 and 210 described with reference to FIGS. 1 and 2.

The base station 305 may transmit a control message 315 to allocate communication resources to the UE 310 for an uplink transmission 370. The control message 315 may include information that allocates a number of resource blocks for the uplink transmission 370, information about a transmit power (e.g., a total transmit power) for the uplink transmission 370, or a combination thereof. The base station 305 may identify communication resources to allocate to the UE 310 based on receiving a scheduling request from the UE 310. The control message 315 may, in some cases, be an example of a scheduling grant. In some cases, the control message 315 may be communicated using a physical downlink control channel (PDCCH).

At block 320, the UE 310 may identify service types (or channels) to be communicated in the uplink transmission 370. A service type or a channel may have a plurality of thresholds associated with it. For example, a URLLC service type may have a reliability threshold and/or a latency threshold associated with it. The service type may be an example of a block of information associated with a specific set of thresholds or dedicated to a specific type of information. In some cases, the term service type and channel may be considered interchangeable.

Types of services types or channels that may be part of the uplink transmission 370 may include PRACH, eMBB channels, URLLC channels, internet of things (IoT) channels, physical uplink control channels (PUCCHs), physical uplink shared channels (PUSCHs), sound reference signal (SRS) channels, other service types, other channels, or any combination thereof. A service type or a channel may also represent a traffic type that is to be communicated using the uplink transmission 370.

In some cases, priority rules may be defined across different channels (e.g., PUCCH & PUCCH, PUCCH & PUSCH). The priority rules may also be applied in collision handling in the same PUCCH group or across different PUCCH groups.

The UE 310 may use a variety of different ways to distinguish between different service types. Specifically, the UE 310 may use techniques to explicitly differentiate between eMBB traffic and URLLC traffic or to implicitly differentiate between eMBB traffic and URLLC traffic.

Examples of explicit techniques may include, among others, an indication field in the downlink control information (DCI), an indication based on a compact DCI (e.g., for HARQ-ACK, PUSCH, asynchronous channel state information (A-CSI), or asynchronous-SRS (A-SRS), or a combination thereof), information based on a search space or a control resource set (CORESET), information based on a bandwidth part (BWP), information based on radio network temporary identifier (RNTI) masking, information based on PDCCH scrambling, or a TRP identifier, or a combination thereof.

Examples of implicit techniques may include, among others, determining if the uplink channel has to carry channel state information (CSI) for processes whose block error rate (BLER) target is lower than the eMBB service, determining if the uplink channel is associated with a DCI detected by a new RNTI in the UE-specific search space (USS), determining if the new channel quality information (CQI) table is used in reporting a CSI on one channel, or determining if the UE processing time is capped at a first value or a second value (e.g., determining if one of the channels follows the cap #2 N1/N2 values, while the other follows cap #1 N1/N2 values).

At block 325, the UE 310 may identify one or more reliability thresholds, one or more latency thresholds, or a combination thereof associated with at least one, if not each, service type or channel identified. These thresholds may be examples of the traffic requirements that the UE 310 may consider when prioritizing service types and channels. The thresholds may, in some cases, be identified using one or more of the explicit or implicit techniques described above.

At block 330, the UE 310 may configure a set of rules for prioritizing service types or channels of the uplink transmission 370. For example, the UE 310 may be configured to select from one or more prioritization rule sets. A first set of rules may define that URLLC traffic receives priority over all eMBB traffic. A second set of rules may define rules where the priority of URLLC traffic and eMBB traffic may be based on the content of the traffic. For example, eMBB traffic with a HARQ acknowledgements (ACKs) or negative acknowledgements (NACKs) may receive priority over some URLLC traffic. A third set of rules may define rules where the UE 310 does not consider URLLC traffic or eMBB traffic when making priority determinations, and instead follows an alternative prioritization.

The UE 310 may be capable of configuring one of the sets of rules for prioritization based on the reliability thresholds or latency thresholds associated with the traffic. Not all URLLC traffic is created with the same constraints or related parameters. Some URLLC traffic may have a latency threshold of 1 millisecond while other URLLC traffic may have a latency threshold of 20 milliseconds. The UE 310 may compare the reliability thresholds and/or the latency thresholds to one or more criteria. If the thresholds satisfy a first criterion, the UE 310 may select the first set of rules.

For example, if the latency threshold for the URLLC traffic is small (e.g., less relaxed), the UE 310 may prioritize at least some, if not all, URLLC traffic over at least some, if not all, eMBB traffic. If the thresholds satisfy a second criterion, the UE 310 may select the second set of rules. For example, if the latency threshold for the URLLC traffic is larger (e.g., more relaxed), the UE 310 may analyze the content of the different traffic types and make prioritization determinations (e.g., based on the content).

At block 335, the UE 310 may determine whether the transmit power of the uplink transmission 370 exceeds the threshold output power of the UE 310 for the uplink transmission 370. In effect, the UE 310 may determine whether service types or channels are scheduled to collide during the uplink transmission 370. Meaning that the UE 310 may want to transmit more information than it has resources to use. The threshold output power of the UE 310 may be an example of the configured maximum output power (e.g., Pcmax) associated with the UE 310 for the uplink transmission. This output power may be allocated by the base station 305 or may be constrained by information received from the base station 305. When the total transmit power exceeds the threshold output power, the UE 310 may perform power scaling on at least a portion of the service types or channels of the uplink transmission 370 or the UE 310 may drop or exclude at least a portion of the service types or channels from the uplink transmission 370. Before performing these operations, the UE 310 may prioritize the service types or channels and then scale the power or drop the information based on that prioritization.

At block 340, the UE 310 may prioritize the service types or channels in the uplink transmission 370. After performing the prioritization, the UE 310 may scale the power of portions of the uplink transmission 370 or drop portions of the uplink transmission 370 based on that prioritization. The UE 310 may apply a variety (e.g., including a combination) of different prioritization schemes or rule sets to accomplish these goals.

At block 345, the UE 310 may implement a first set of rules for prioritization. The set of rules of prioritization associated with block 345 may indicate that URLLC service types get priority over eMBB service types. In such cases, all URLLC traffic may be prioritized over all eMBB traffic. When prioritizing between multiple URLLC channels and/or between multiple eMBB channels, the UE 310 may consider the content of the various channels.

In some cases, in this set of rules, the PRACH on the primary cell may have priority over all URLLC channels and all URLLC channels may have priority over all eMBB channels. In such a set of rules, the URLLC channels may experience a collision with an eMBB channel based on the inclusion of the PRACH of the primary channel.

When prioritizing between different URLLC channels, the content of the URLLC channels may be considered. As one example, a URLLC channel that is a PUCCH transmission with HARQ ACK or NACK (whether PUCCH or PUSCH) may be prioritized over a URLLC channel with CSI (whether PUCCH or PUSCH), which may be prioritized over a URLLC channel that is a PUSCH transmission without a HARQ ACK or NACK, which may be prioritized over an SRS transmission with A-SRS, which may be prioritized over semi-persistent SRS transmissions or periodic SRS transmissions, which may be prioritized over PRACH transmissions on a secondary cell.

When prioritizing between different eMBB channels, the content of the eMBB channels may be considered. As one example, a eMBB channel that is a PUCCH transmission with HARQ ACK or NACK (whether PUCCH or PUSCH) may be prioritized over a eMBB channel with CSI (whether PUCCH or PUSCH), which may be prioritized over a eMBB channel that is a PUSCH transmission without a HARQ ACK or NACK, which may be prioritized over an SRS transmission with A-SRS, which may be prioritized over semi-persistent SRS transmissions or periodic SRS transmissions, which may be prioritized over PRACH transmissions on a secondary cell.

At block 350, the UE 310 may implement a second set of rules for prioritization. The set of rules of prioritization associated with block 350 may indicate that content of the URLLC service types and the eMBB service types are considered during the prioritization process. For example, an eMBB channel with a HARQ ACK or NACK may be prioritized over a URLLC channel that does not include a HARQ ACK or NACK. Such a configuration may add to the latency of some URLLC channels but may protect some eMBB downlink information to an extent.

An example of the prioritization rules associated with block 350 is shown in the list below. Items higher in the list may be given a higher priority than items lower on the list. Alternatively, in some examples, items lower in the list may be given a higher priority than items higher on the list. The prioritization rules for when the content of service types is considered may be as follows:

PRACH on a primary cell may have the highest priority and may have priority over,
PUCCH or PUSCH with HARQ-ACK for URLLC, which may have priority over,
PUCCH or PUSCH with HARQ-ACK for eMBB, which may have priority over,
PUCCH or PUSCH with CSI for URLLC, which may have priority over,
PUSCH without ARQ-ACK or CSI for URLLC, which may have priority over,
PUCCH or PUSCH with CSI for eMBB, which may have priority over,
PUSCH without HARQ-ACK or CSI for eMBB, which may have priority over,
Aperiodic SRS for URLLC, which may have priority over,
SP-SRS/P-SRS for URLLC, which may have priority over,
PRACH on secondary cells for URLLC (assuming URLLC logical channels cannot be mapped to eMBB SR resources.), which may have priority over,
Aperiodic SRS for eMBB, which may have priority over,
SP-SRS/P-SRS for eMBB, which may have priority over,
PRACH on secondary cells for eMBB.

In some cases, the order of the list may be changed, some items may be omitted or added to the list, or some combination.

To prioritize service types or channels, the UE 310 may make one or more determinations about the content of the service types or channels. For example, the UE 310 may determine whether a service type or channel includes a HARQ ACK or NACK; the UE 310 may determine whether a service type or channel includes CSI; the UE 310 may determine whether a service type or channel includes A-SRS, SP-SRS, or P-SRS; or a combination thereof. In some cases, the UE 310 may determine whether the service type is being transmitted via PUCCH or PUSCH.

In some cases, the UE 310 may prioritize service types or channels based on the PUCCH group being used. For example, the UE 310 may prioritize service types or channels of a primary PUCCH group over service types or channels of secondary PUCCH groups. This type of prioritization may be applied to prioritization rules associated with block 345 or the prioritization rules associated with block 350. An example of this type of prioritization may include where PUCCH or PUSCH with HARQ-ACK for URLLC on a primary PUCCH group may have priority over, PUCCH or PUSCH with HARQ-ACK for URLLC on a secondary PUCCH group, which may have priority over PUCCH or PUSCH with HARQ-ACK for eMBB on a primary PUCCH group, which may have priority over PUCCH or PUSCH with HARQ-ACK for eMBB on a secondary PUCCH group, which may have priority over PUCCH or PUSCH with CSI for URLLC on a primary PUCCH group, which may have priority over other service types or channels, etc.

At block 355, the UE 310 may implement a third set of rules for prioritization associated with PRACH. There are four primary scenarios where a random access channel (RACH) may be attempted while the UE 310 is in an RRC connected mode: first, for PDCCH order after a loss of uplink synchronization; second, during a handover; third, when a scheduling request for a logical channel is not configured with PUCCH resources; or fourth, during beam failure recovery. PRACH may not collide with other service types or channels during the first scenario because when an uplink sync is lost, transmission over uplink channels is not allowed. PRACH may not collide with other service types or channels during the second scenario because when the UE 310 is performing a handover there is likely not other uplink channels being communicated. PRACH may collide with other service types or channels during the third scenario and/or the fourth scenario. For example, during the third scenario a PRACH may collide with a beamforming reference signal (BSR) transmitted on PUSCH or may collide with PUCCH for pre-configured CSI reporting. During the fourth scenario a PRACH may collide with URLLC channels.

In some cases, PRACH on the primary cell may have a higher priority than other channels. In such cases, PRACH on the primary cell may have a higher priority than any URLLC or eMBB service types or channels. Also in such cases, PRACH on a secondary cell may have a lower priority than URLLC service types or channels. In some instances, PRACH on a secondary cell may have a higher priority than at least some eMBB service types.

In some cases, PRACH (whether on the primary cell or secondary cell) may have a lower priority than URLLC service types. In such cases, PUSCH, PUCCH, and/or SRS associated with URLLC may be have a higher priority than PRACH.

Any of these options for prioritizing PRACH may be used with the sets of rules described with reference to block 345 and block 350. As such, the prioritization rules associated with block 345 and block 350 may be modified to incorporate at least some of the PRACH prioritization rules.

At block 360, the UE 310 may optionally exclude or drop at least a portion of the uplink transmission 370 based on the prioritization. In some cases, the UE 310 may exclude or drop entire service types or channels from the uplink transmission. In some cases, the UE 310 may exclude or drop at least a portion of a service type or channel based on the prioritization. The UE 310 may drop the information that has the lowest priority (e.g., as determined by the prioritization process).

In some cases, dropping or excluding an overlapping portion of one of the service types or channels may introduce a phase discontinuity. The UE 310 may determine whether to drop or exclude the remaining portion after the overlapping portion or to send the remaining portion after the overlapping portion based on whether there is a demodulation reference signal (DMRS) in the remaining portion. If the DMRS is present in the remaining portion, the UE 310 may transmit the remaining portion. If the DMRS is not present in the remaining portion, the UE 310 may drop or exclude the remaining portion.

If the transmit power of the uplink transmission 370 still exceeds the threshold output power after this, the UE 310 may continue excluding or dropping at least portions of the lowest priority service types or channels. In effect, the UE 310 may follow a protocol or configuration to work its way up the ordered list of service types or channels generated by the prioritization procedure and drop or exclude information until the transmit power of the uplink transmission 370 is below the threshold output power.

At block 365, the UE 310 may optionally scale the transmit power for at least a portion of the uplink transmission 370 based on the prioritization. In some cases, the UE 310 may scale the transmit power of entire service types or channels. Scaling the transmit power may refer to reducing the transmit power of the identified service type or channel from its original transmit power to some other level. In some cases, the UE 310 may scale the transmit power of at least a portion of a service type or channel based on the prioritization. The UE 310 may begin by scaling the transmit power of the information that has the lowest priority as determined by the prioritization process.

If the transmit power of the uplink transmission 370 still exceeds the threshold output power, the UE 310 may continue scaling the transmit power of at least portions of the lowest priority service types or channels. In effect, the UE 310 may follow a protocol or configuration to work its way up the ordered list of service types or channels generated by the prioritization procedure and scale the transmit power of the information until the transmit power of the uplink transmission 370 is below the threshold output power.

In some cases, the UE 310 may exclude or drop at least portions of some service types or channels and may scale the transmit power of at least portions of other service types or channels. Using this combination of dropping and scaling, the UE 310 may be configured to retain more information in the uplink transmission 370 and increase the efficacy of the uplink transmission 370.

The UE 310 may transmit the uplink transmission 370 based on excluding service types or channels, scaling the transmit power of service types or channels, or a combination thereof. Such power adjustment procedures may be performed based on performing one or more prioritization procedures on the service types or channels originally included in the uplink transmission 370 by the UE 310.

Figure 4:
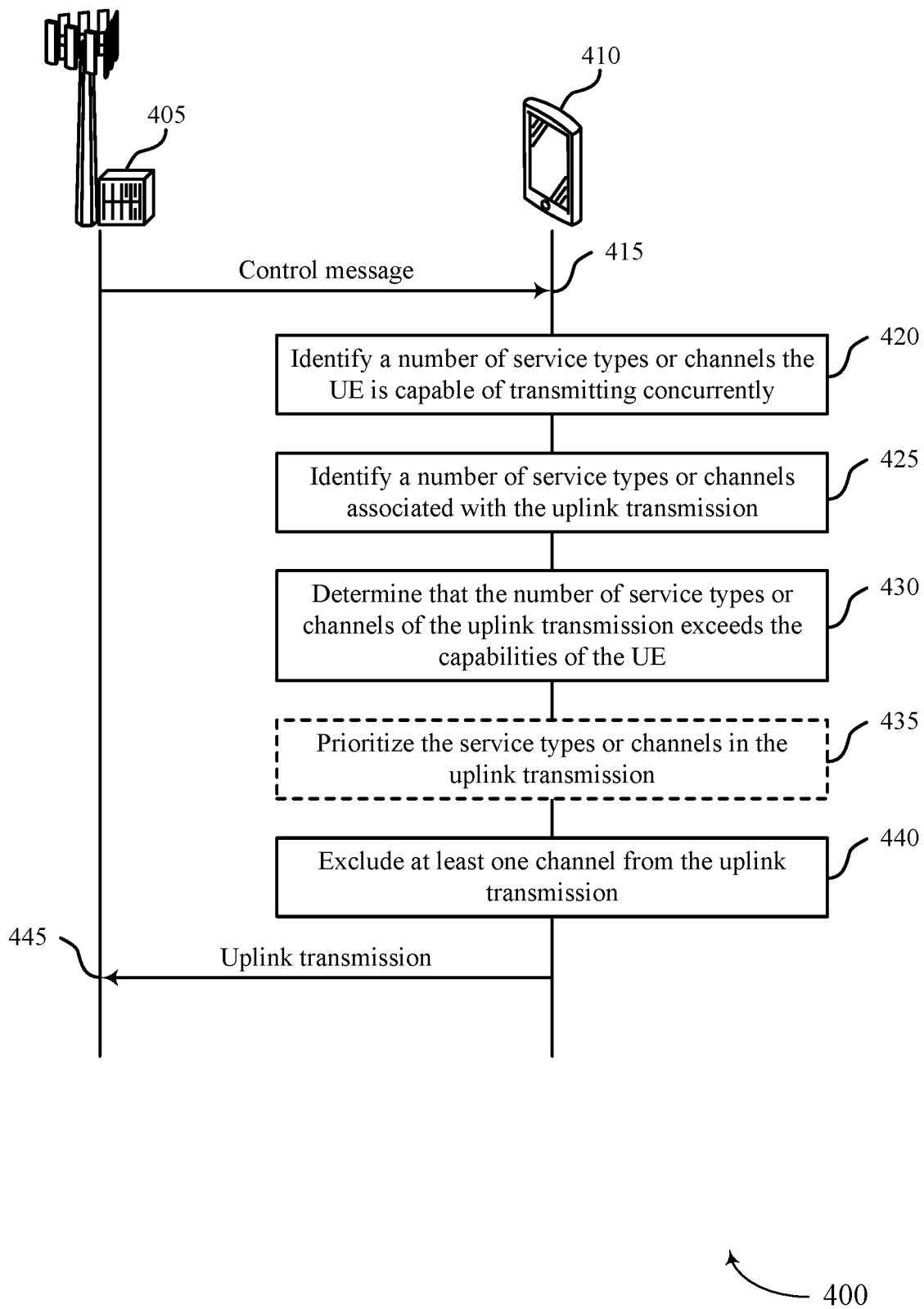
FIG. 4 illustrates an example of a process flow that supports uplink collision handling in accordance with aspects of the present disclosure.

FIG. 4 illustrates an example of a process flow 400 that supports uplink collision handling in accordance with aspects of the present disclosure. In some examples, the process flow 400 may implement aspects of wireless communications systems 100 or 200. The process flow 400 may illustrate prioritization procedures configured to exclude or drop channels from an uplink transmission 445 if the quantity of channels exceeds the capabilities of the UE 410. The process flow 400 may illustrate functions performed by and signals exchanged between the base station 405 and the UE 410. The base station 405 may be an example of the base stations 105, 205, and 305 described with reference to FIGS. 1 through 3. The UE 410 may be an example of the UEs 115, 210, and 310 described with reference to FIGS. 1 through 3.

The base station 405 may transmit a control message 415 to allocate communication resources to the UE 410 for an uplink transmission 445. The control message 415 may include information that allocates a number of resource blocks for the uplink transmission 445, information about a total transmit power for the uplink transmission 445, or a combination thereof. The base station 405 may identify communication resources to allocate to the UE 410 based on receiving a scheduling request from the UE 410. The control message 415 may be an example of a scheduling grant. In some cases, the control message 415 may be communicated using PDCCH.

At block 420, the UE 410 may identify a number or quantity of service types or channels the UE 410 is capable of transmitting concurrently. The UE 410 may be limited by hardware, firmware, or software from transmitting certain numbers of service types or transmission in the same uplink transmission 445. In some cases, the UE 410 may retrieve the UE's capability from read-only memory. In some cases, the number of channels the UE 410 may be capable of transmitting concurrently are identified for each PUCCH group associated with the UE 410 and/or the uplink transmission 445. In some cases, the number of channels the UE 410 is capable of transmitting concurrently are identified across all uplink carriers associated with the UE 410 and/or the uplink transmission 445.

At block 425, the UE 410 may identify a number or quantity of service types or channels that are associated with the uplink transmission 445. To do this, the UE 410 may identify the service types or channels to be communicated in the uplink transmission 445. In some cases, the number of channels that are associated with the uplink transmission 445 are identified for each PUCCH group associated with the UE 410 and/or the uplink transmission 445. In some cases, the number of channels that are associated with the uplink transmission 445 are identified across all uplink carriers associated with the UE 410 and/or the uplink transmission 445.

A service type or a channel may have a plurality of thresholds associated with it. For example, a URLLC service type may have a reliability threshold and/or a latency threshold associated with it. The service type may be an example of a block of information associated with a specific set of thresholds or dedicated to a specific type of information. In some cases, the term service type and channel may be interchangeable. Types of services types or channels that may be part of the uplink transmission 445 may include PRACH, eMBB channels, URLLC channels, IoT channels, PUCCHs, PUSCHs, SRS channels, or combinations thereof. A service type or a channel may also represent a traffic type that is to be communicate using the uplink transmission 445.

The UE 410 may use a variety of different ways to distinguish between different service types. Specifically, the UE 410 may use techniques to explicitly differentiate between eMBB traffic and URLLC traffic or to implicitly differentiate between eMBB traffic and URLLC traffic. The UE 410 may use any of the examples of explicit techniques or the implicit techniques described with reference to block 325 in FIG. 3.

In some cases, the UE 410 may identify one or more reliability thresholds, one or more latency thresholds, or a combination thereof associated with each service type or channel identified. These thresholds may be examples of the traffic requirements that the UE 410 may consider when prioritizing service types and channels. The thresholds may be identified using one or more of the explicit or implicit techniques described with reference to block 325 in FIG. 3.

At block 430, the UE 410 may determine that the number of service types or channels associated with the uplink transmission 445 exceeds the number of service types or channels the UE 410 is capable of transmitting concurrently. The UE 410 may be configured to exclude or drop channels based on this determination. The UE 410 may have to determine which channels should be kept and which ones should be excluded.

At block 435, the UE 410 may optionally prioritize the service types or the channels in the uplink transmission 445. The purpose of this prioritization may determine which service types or channels should be excluded or dropped before the uplink transmission 445 is transmitted. The UE 410 may use any of the prioritization rule sets described with reference to blocks 340, 345, 350, 355 in FIG. 3 to determine which service types or channels may be excluded or dropped. In some cases, the UE 410 may perform one or more of the other procedures of the process flow 300 to fully execute the prioritization rules. For example, the UE 410 may perform at least portions of the functions associated with blocks 320, 325, 330, 335, 340, 345, 350, or 355 as part of prioritizing the service types or channels.

At block 440, the UE 410 may exclude or drop at least one service type or channel from the uplink transmission 445. In some cases, this may be based on the prioritization. In some cases, the UE 410 may exclude or drop entire service types or channels from the uplink transmission. In some cases, the UE 410 may exclude or drop at least a portion of a service type or channel based on the prioritization. The UE 410 may begin by dropping the information that has the lowest priority as determined based on the prioritization process.

If the transmit power of the uplink transmission 445 still exceeds the threshold output power, the UE 410 may continue excluding or dropping at least portions of the lowest priority service types or channels. In effect, the UE 410 may follow a protocol or configuration to work its way up the ordered list of service types or channels generated by the prioritization procedure and drop or exclude information until the transmit power of the uplink transmission 445 is below the threshold output power.

The UE 410 may transmit the uplink transmission 445 based on excluding service types or channels. Such power adjustment procedures may be performed based on performing one or more prioritization procedures on the service types or channels originally included in the uplink transmission 445 by the UE 410.

Figure 5:
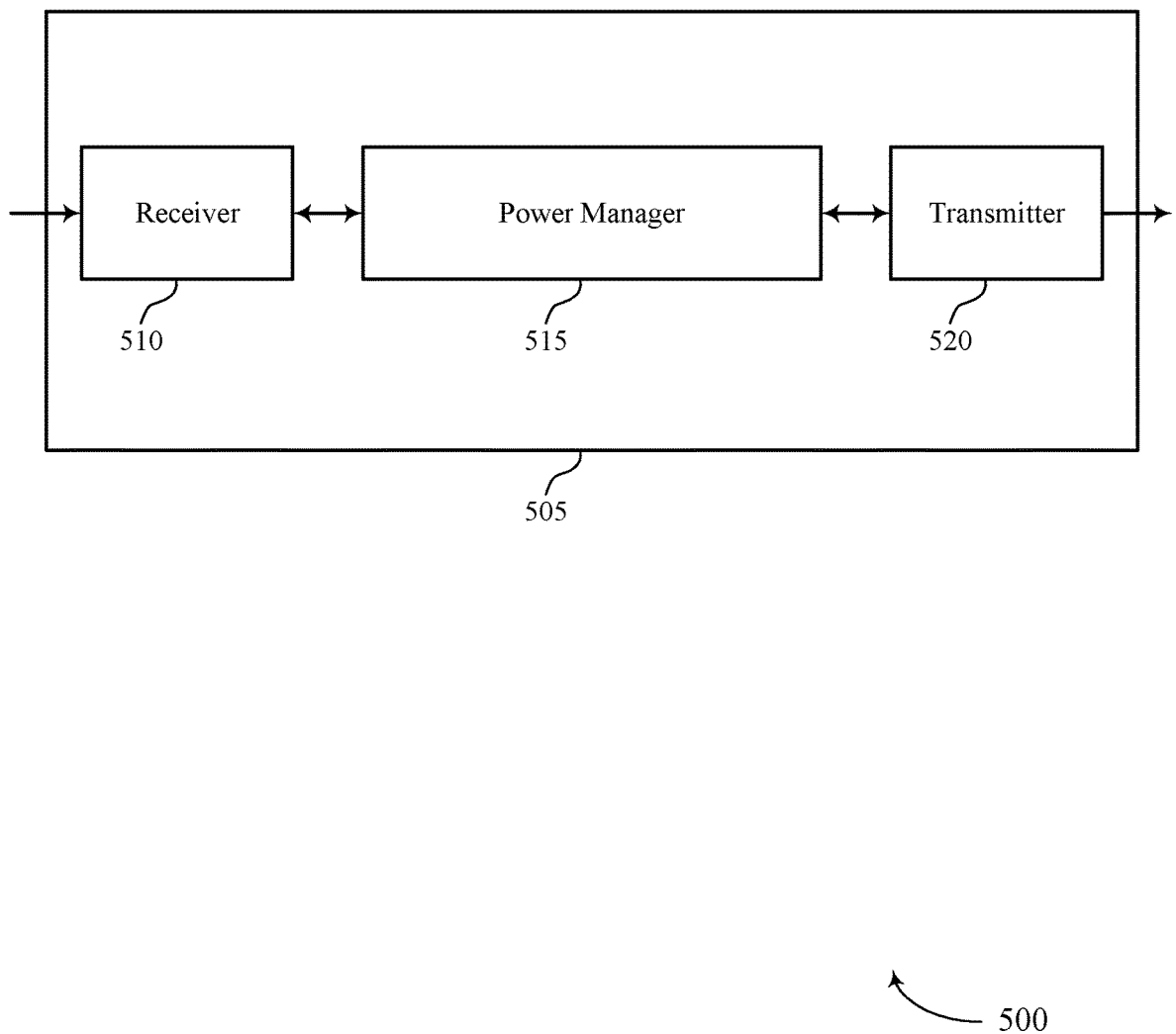
FIGS. 5 and 6 show block diagrams of devices that support uplink collision handling in accordance with aspects of the present disclosure.

FIG. 5 shows a block diagram 500 of a device 505 that supports uplink collision handling in accordance with aspects of the present disclosure. The device 505 may be an example of aspects of a UE 115 as described herein. The device 505 may include a receiver 510, a power manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink collision handling). Information may be passed on to other components of the device 505. The receiver 510 may be an example of aspects of the transceiver 820 described with reference to FIG. 8. The receiver 510 may utilize a single antenna or a set of antennas.

The power manager 515 may identify that an uplink transmission includes a first service type and a second service type that is associated with a reliability threshold and a latency threshold, determine that a transmit power of the uplink transmission exceeds a threshold output power of a UE, prioritize the second service type based on determining that the transmit power exceeds the threshold output power, the reliability threshold, and the latency threshold, and transmit the uplink transmission.

The power manager 515 may also identify a first quantity of channels a UE is capable of transmitting concurrently, determine that the second quantity of channels associated with the uplink transmission exceeds the first quantity of channels, exclude at least one channel associated with the uplink transmission based on determining that the second quantity of channels associated with the uplink transmission exceeds the first quantity of channels, identify a second quantity of channels associated with an uplink transmission of the UE, and transmit the uplink transmission based on excluding the at least one channel of the uplink transmission. The power manager 515 may be an example of aspects of the power manager 810 described herein.

The power manager 515, or its sub-components, may be implemented in hardware, code (e.g., software or firmware) executed by a processor, or any combination thereof. If implemented in code executed by a processor, the functions of the power manager 515, or its sub-components may be executed by a general-purpose processor, a digital signal processor (DSP), an application-specific integrated circuit (ASIC), a field-programmable gate array (FPGA), other programmable logic device (PLD), discrete gate or transistor logic, discrete hardware components, or any combination thereof designed to perform the functions described in the present disclosure.

The power manager 515, or its sub-components, may be physically located at various positions, including being distributed such that portions of functions are implemented at different physical locations by one or more physical components. In some examples, the power manager 515, or its sub-components, may be a separate and distinct component in accordance with various aspects of the present disclosure. In some examples, the power manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
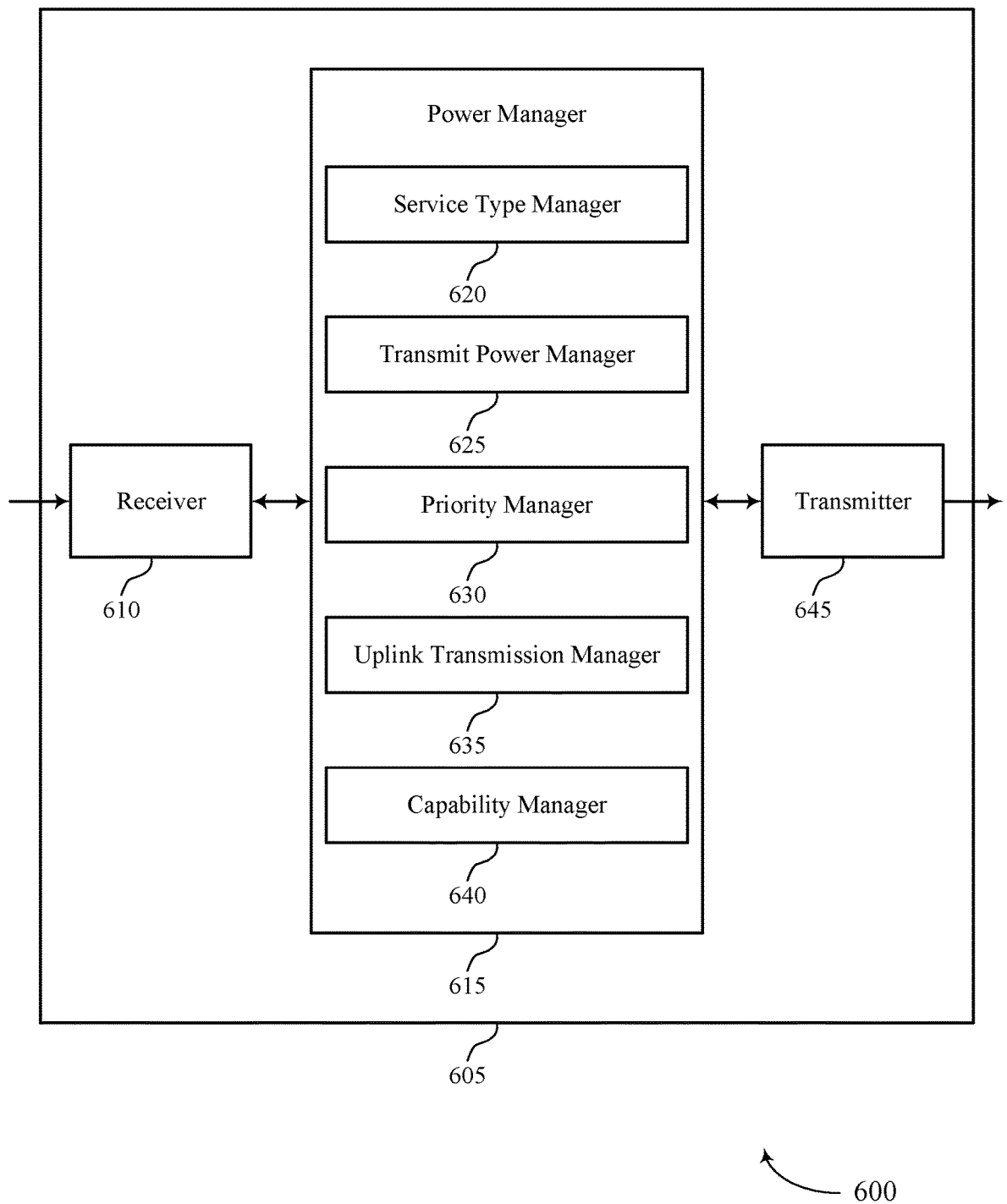

FIG. 6 shows a block diagram 600 of a device 605 that supports uplink collision handling in accordance with aspects of the present disclosure. The device 605 may be an example of aspects of a device 505 or a UE 115 as described herein. The device 605 may include a receiver 610, a power manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to uplink collision handling). Information may be passed on to other components of the device 605. The receiver 610 may be an example of aspects of the transceiver 820 described with reference to FIG. 8. The receiver 610 may utilize a single antenna or a set of antennas.

The power manager 615 may be an example of aspects of the power manager 515 as described herein. The power manager 615 may include a service type manager 620, a transmit power manager 625, a priority manager 630, an uplink transmission manager 635, and a capability manager 640. The power manager 615 may be an example of aspects of the power manager 810 described herein.

The service type manager 620 may identify that an uplink transmission includes a first service type and a second service type that is associated with a reliability threshold and a latency threshold. Additionally or alternatively, the service type manager 620 may identify that an uplink transmission includes a first channel associated with a first reliability threshold and a first latency threshold and a second channel associated with a second reliability threshold and a second latency threshold. The transmit power manager 625 may determine that a transmit power of the uplink transmission exceeds a threshold output power of a UE. The transmit power manager 625 may also determine that the first channel and the second channel are scheduled to collide during the uplink transmission. The transmit power manager 625 may determine that the first channel and the second channel are scheduled to collide during the uplink transmission based on determining that the transmit power exceeds the threshold output power.

The priority manager 630 may prioritize the second service type based on determining that the transmit power exceeds the threshold output power, the reliability threshold, and the latency threshold. Additionally or alternatively, the priority manager 630 may prioritize the second channel based on determining that the first channel and the second channel are scheduled to collide during the uplink transmission, the first reliability threshold, the second reliability threshold, the first latency threshold, and the second latency threshold. The uplink transmission manager 635 may transmit the uplink transmission.

The capability manager 640 may identify a first quantity of channels a UE is capable of transmitting concurrently, determine that the second quantity of channels associated with the uplink transmission exceeds the first quantity of channels, and exclude at least one channel associated with the uplink transmission based on determining that the second quantity of channels associated with the uplink transmission exceeds the first quantity of channels.

The uplink transmission manager 635 may identify a second quantity of channels associated with an uplink transmission of the UE and transmit the uplink transmission based on excluding the at least one channel of the uplink transmission.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
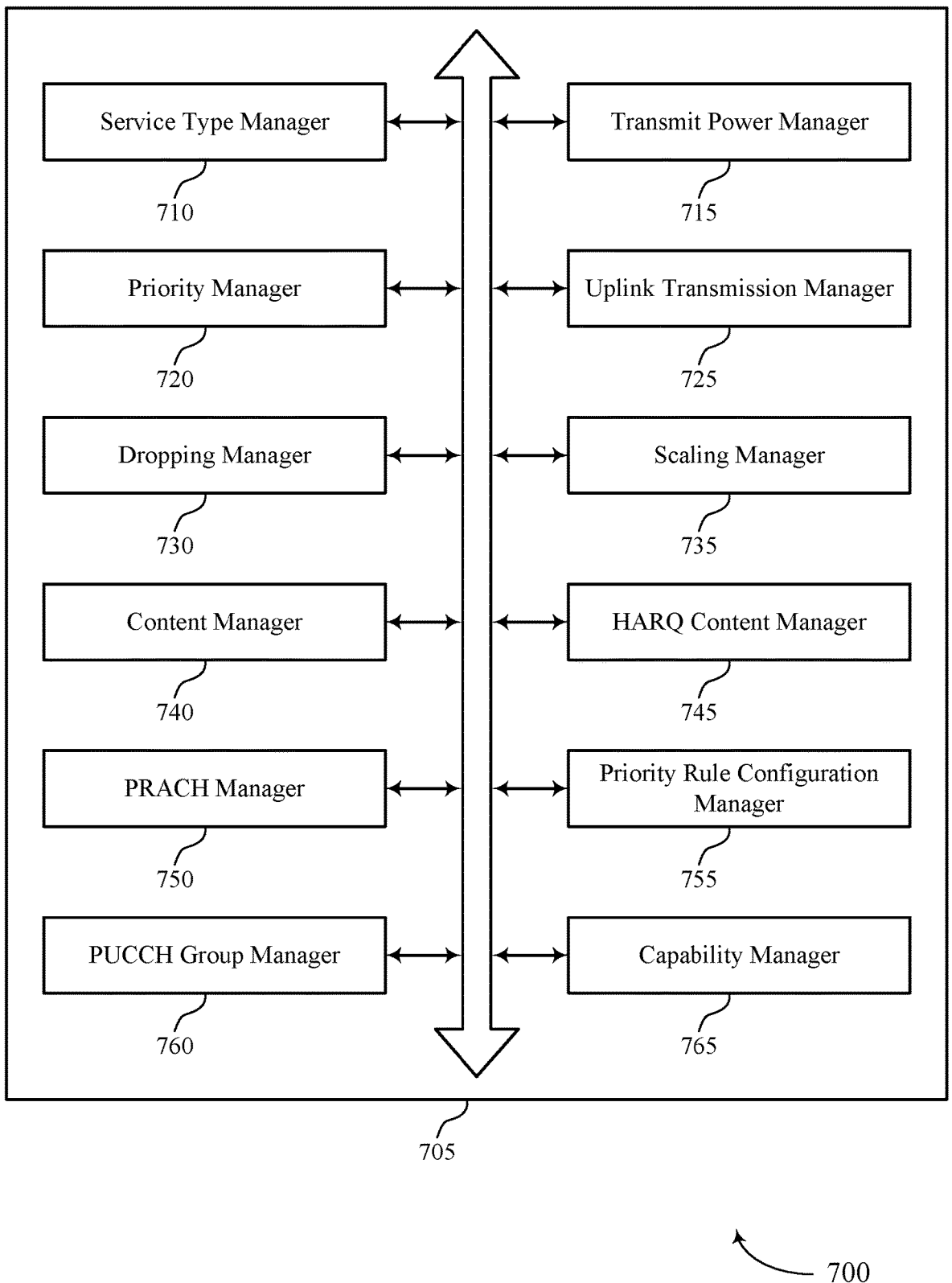
FIG. 7 shows a block diagram of a power manager that supports uplink collision handling in accordance with aspects of the present disclosure.

FIG. 7 shows a block diagram 700 of a power manager 705 that supports uplink collision handling in accordance with aspects of the present disclosure. The power manager 705 may be an example of aspects of a power manager 515, a power manager 615, or a power manager 810 described herein. The power manager 705 may include a service type manager 710, a transmit power manager 715, a priority manager 720, an uplink transmission manager 725, a dropping manager 730, a scaling manager 735, a content manager 740, a HARQ content manager 745, a PRACH manager 750, a priority rule configuration manager 755, a PUCCH group manager 760, and a capability manager 765. Each of these modules may communicate, directly or indirectly, with one another (e.g., via one or more buses).

The service type manager 710 may identify that an uplink transmission includes a first service type and a second service type that is associated with a reliability threshold and a latency threshold. Additionally or alternatively, the service type manager 710 may identify that an uplink transmission includes a first channel associated with a first reliability threshold and a first latency threshold and a second channel associated with a second reliability threshold and a second latency threshold. In some cases, the first service type includes an eMBB channel and the second service type includes an URLLC channel. In some cases, the first channel includes an eMBB channel and the second channel includes an URLLC channel.

The transmit power manager 715 may determine that a transmit power of the uplink transmission exceeds a threshold output power of a UE. The transmit power manager 715 may also determine that the first channel and the second channel are scheduled to collide during the uplink transmission. In some cases, the threshold output power of the UE is a configured maximum output power.

The priority manager 720 may prioritize the second service type based on determining that the transmit power exceeds the threshold output power, the reliability threshold, and the latency threshold. Additionally or alternatively, the priority manager 720 may prioritize the second channel based on determining that the first channel and the second channel are scheduled to collide during the uplink transmission, the first reliability threshold, the second reliability threshold, the first latency threshold, and the second latency threshold. In some examples, the priority manager 720 may prioritize the second service type over the first service type based on the uplink transmission including both the second service type and the first service type, where prioritizing the second service type is based on prioritizing the second service type over the first service type. Additionally or alternatively, the priority manager 720 may prioritize the second channel over the first channel based on the uplink transmission including both the second channel and the first channel, where prioritizing the second channel is based on prioritizing the second channel over the first channel.

In some examples, the priority manager 720 may prioritize all second service types of the uplink transmission over all first service types of the uplink transmission. In some examples, the priority manager 720 may prioritize all second channels of the uplink transmission over all first channels of the uplink transmission. In some examples, the priority manager 720 may identify that the second quantity of channels of the uplink transmission includes a first service type and a second service type that is associated with a reliability threshold and a latency threshold. Additionally or alternatively, the priority manager 720 may identify that the second quantity of channels of the uplink transmission includes a first channel associated with a first reliability threshold and a first latency threshold and a second channel associated with a second reliability threshold and a second latency threshold. In some examples, the priority manager 720 may prioritize the second quantity of channels of the uplink transmission based on the uplink transmission including the second service type, where excluding the at least one channel is based on prioritizing the second quantity of channels.

In some examples, the priority manager 720 may determine that the first channel and the second channel occur on one or more intra-band contiguous component carriers, where prioritizing the second channel is based on determining that the first channel and the second channel occur on one or more intra-band contiguous component carriers.

In some examples, the priority manager 720 may prioritize a second service type of the uplink transmission that is associated with a reliability threshold and a latency threshold over a first service type, where excluding the at least one channel is based on prioritizing the second service type over the first service type. In some examples, the priority manager 720 may determine that a first service type includes a HARQ ACK or NACK.

In some examples, the priority manager 720 may prioritize the first service type over a second service type that is associated with a reliability threshold and a latency threshold based on determining that the first service type includes HARQ ACK/NACK, where excluding the at least one channel is based on prioritizing the first service type over the second service type.

The uplink transmission manager 725 may transmit the uplink transmission. In some examples, the uplink transmission manager 725 may identify a second quantity of channels associated with an uplink transmission of the UE. In some examples, the uplink transmission manager 725 may transmit the uplink transmission based on excluding the at least one channel of the uplink transmission. In some examples, the uplink transmission manager 725 may determine to exclude or scale a transmit power of the first service type in the uplink transmission based on the prioritizing, where transmitting the uplink transmission is based on determining to exclude or scale the transmit power of the first service type. In some examples, the uplink transmission manager 725 may determine to exclude or scale a transmit power of the first channel in the uplink transmission based on the prioritizing, where transmitting the uplink transmission is based on determining to exclude or scale the transmit power of the first channel.

The dropping manager 730 may exclude at least a portion of the first service type from the uplink transmission based on prioritizing the second service type, where transmitting the uplink transmission is based on excluding the portion of the first service type. Additionally or alternatively, the dropping manager 730 may exclude at least a portion of the first channel from the uplink transmission based on prioritizing the second channel, where transmitting the uplink transmission is based on excluding the portion of the first channel.

The scaling manager 735 may scale a transmit power associated with at least a portion of the first service type based on prioritizing the second service type, where transmitting the uplink transmission is based on scaling the transmit power associated with the portion of the first service type. Additionally or alternatively, the scaling manager 735 may scale a transmit power associated with at least a portion of the first channel based on prioritizing the second channel, where transmitting the uplink transmission is based on scaling the transmit power associated with the portion of the first channel.

The content manager 740 may determine a first content of the first service type and a second content of the second service type, where prioritizing the second service type is based on determining the first content and the second content. Additionally or alternatively, the content manager 740 may determine a first content of the first channel and a second content of the second channel, where prioritizing the second service type is based on determining the first content and the second content. In some examples, the content manager 740 may prioritize the first service type over the second service type based on determining the first content and the second content, where prioritizing the second service type is based on prioritizing the first service type over the second service type. The content manager 740 may also prioritize the first channel over the second channel based on determining the first content and the second content, where prioritizing the second channel is based on prioritizing the first channel over the second channel.

The HARQ content manager 745 may determine that the first service type and/or the first channel includes a HARQ ACK or NACK. In some examples, the HARQ content manager 745 may prioritize the first service type over the second service type based on determining that the first service type includes HARQ ACK or NACK, where prioritizing the second service type is based on prioritizing the first service type over the second service type. In some examples, the HARQ content manager 745 may prioritize the first channel over the second channel based on determining that the first channel includes HARQ ACK or NACK, where prioritizing the second channel is based on prioritizing the first channel over the second channel. In some examples, the HARQ content manager 745 may determine that the second service type does not include HARQ ACK or NACK, where prioritizing the first service type over the second service type is based on determining that the second service type does not include HARQ ACK or NACK. In some examples, the HARQ content manager 745 may determine that the second channel does not include HARQ ACK or NACK, where prioritizing the first channel over the second channel is based on determining that the second channel does not include HARQ ACK or NACK.

The PRACH manager 750 may identify that the uplink transmission includes a PRACH. In some examples, the PRACH manager 750 may prioritize the PRACH over the second service type and the first service type, where prioritizing the second service type is based on prioritizing the PRACH over the second service type and the first service type. In some examples, the PRACH manager 750 may identify that the uplink transmission includes a PRACH on a secondary cell. In some examples, the PRACH manager 750 may prioritize the second service type over the PRACH on the secondary cell, where prioritizing the second service type is based on prioritizing the second service type over the PRACH. In some examples, the PRACH manager 750 may prioritize the second service type over the PRACH and the PRACH over the first service type, where prioritizing the second service type is based on prioritizing the second service type over the PRACH and the PRACH over the first service type. In some cases, the PRACH collides with the second service type and the first service type when a scheduling request for a logical channel is not configured with PUCCH resources or beam failure recovery.

Additionally or alternatively, the PRACH manager 750 may prioritize the PRACH over the second channel and the first channel where prioritizing the second channel is based on prioritizing the PRACH over the second channel and the first channel. In some examples, the PRACH manager 750 may identify that the uplink transmission includes a PRACH on a secondary cell. In some examples, the PRACH manager 750 may prioritize the second channel over the PRACH on the secondary cell, where prioritizing the second channel is based on prioritizing the second channel over the PRACH. In some examples, the PRACH manager 750 may prioritize the second channel over the PRACH and the PRACH over the first channel, where prioritizing the second channel is based on prioritizing the second channel over the PRACH and the PRACH over the first channel. In some cases, the PRACH collides with the second channel and the first channel when a scheduling request for a logical channel is not configured with PUCCH resources or beam failure recovery.

The priority rule configuration manager 755 may determine that the reliability threshold, the latency threshold, or a combination thereof satisfy a criterion. In some examples, the priority rule configuration manager 755 may configure the UE with a set of prioritization rules based on based on the determining that the reliability threshold, the latency threshold, or the combination thereof satisfy the criterion, where prioritizing the second service type is based on configuring the UE with the set of prioritization rules.

The priority rule configuration manager 755 may also determine that the first reliability threshold, the second reliability threshold, the first latency threshold, the second reliability threshold, or a combination thereof satisfy a criterion. In some examples, the priority rule configuration manager 755 may configure the UE with a set of prioritization rules based on based on the determining that the first reliability threshold, the second reliability threshold, the first latency threshold, the second latency threshold, or the combination thereof satisfy the criterion, where prioritizing the second channel is based on configuring the UE with the set of prioritization rules.

The PUCCH group manager 760 may identify that the uplink transmission includes a set of different PUCCH groups. In some examples, the PUCCH group manager 760 may prioritize a primary PUCCH group over a secondary PUCCH group, where prioritizing the second service type or the second channel is based on prioritizing the primary PUCCH group over the secondary PUCCH group. In some cases, the first quantity of channels and the second quantity of channels are identified for each PUCCH group associated with the UE. In some cases, the first quantity of channels is defined across all uplink carriers associated with the UE.

The capability manager 765 may identify a first quantity of channels a UE is capable of transmitting concurrently. In some examples, the capability manager 765 may determine that the second quantity of channels associated with the uplink transmission exceeds the first quantity of channels. In some examples, the capability manager 765 may exclude at least one channel associated with the uplink transmission based on determining that the second quantity of channels associated with the uplink transmission exceeds the first quantity of channels.

Figure 8:
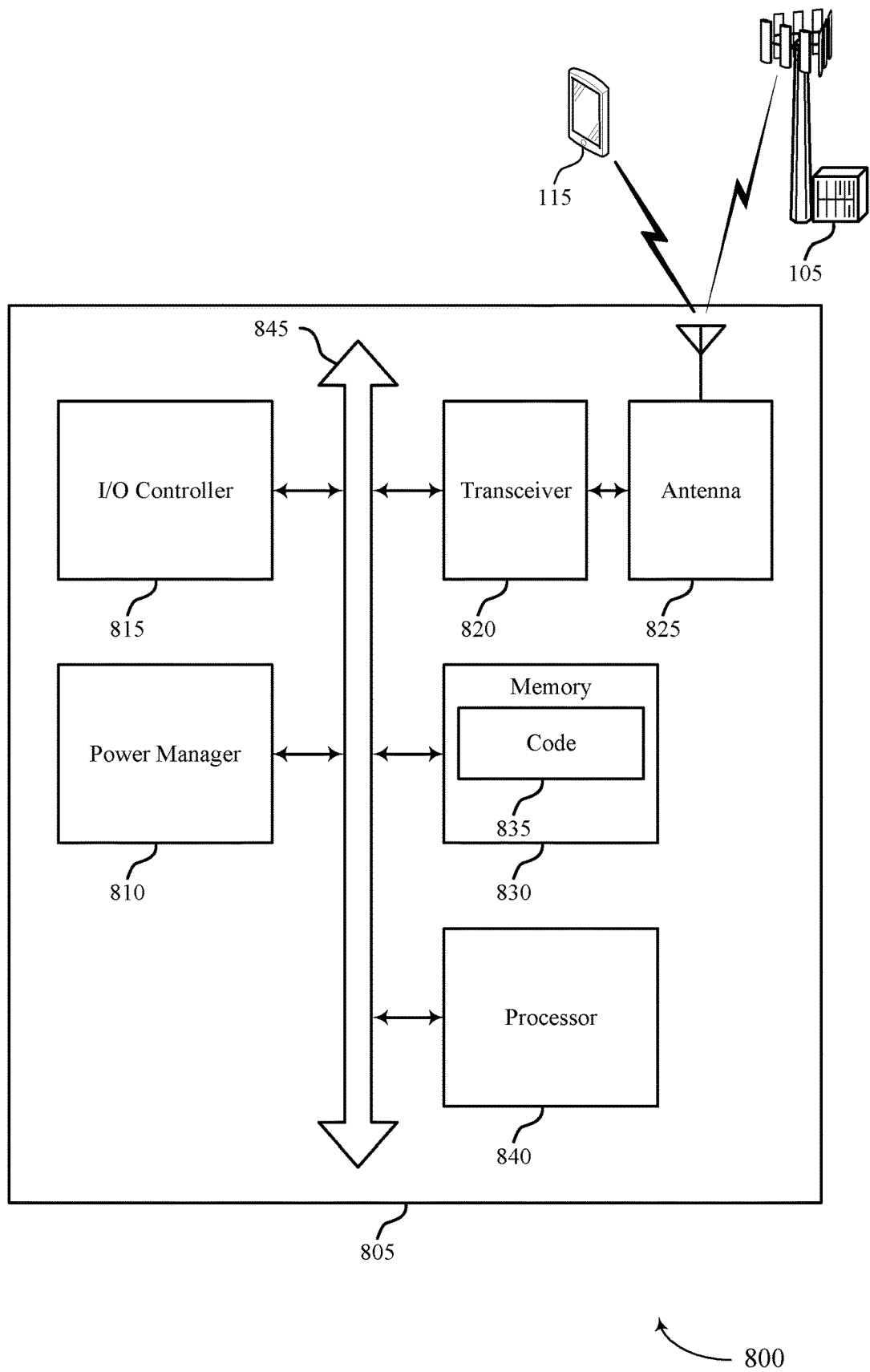
FIG. 8 shows a diagram of a system including a device that supports uplink collision handling in accordance with aspects of the present disclosure.

FIG. 8 shows a diagram of a system 800 including a device 805 that supports uplink collision handling in accordance with aspects of the present disclosure. The device 805 may be an example of or include the components of device 505, device 605, or a UE 115 as described herein. The device 805 may include components for bi-directional voice and data communications including components for transmitting and receiving communications, including a power manager 810, an I/O controller 815, a transceiver 820, an antenna 825, memory 830, and a processor 840. These components may be in electronic communication via one or more buses (e.g., bus 845).

The power manager 810 may identify that an uplink transmission includes a first service type and a second service type that is associated with a reliability threshold and a latency threshold, determine that a transmit power of the uplink transmission exceeds a threshold output power of a UE, prioritize the second service type based on determining that the transmit power exceeds the threshold output power, the reliability threshold, and the latency threshold, and transmit the uplink transmission. The power manager 810 may also identify a first quantity of channels a UE is capable of transmitting concurrently, determine that the second quantity of channels associated with the uplink transmission exceeds the first quantity of channels, exclude at least one channel associated with the uplink transmission based on determining that the second quantity of channels associated with the uplink transmission exceeds the first quantity of channels, identify a second quantity of channels associated with an uplink transmission of the UE, and transmit the uplink transmission based on excluding the at least one channel of the uplink transmission.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases, the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink collision handling).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
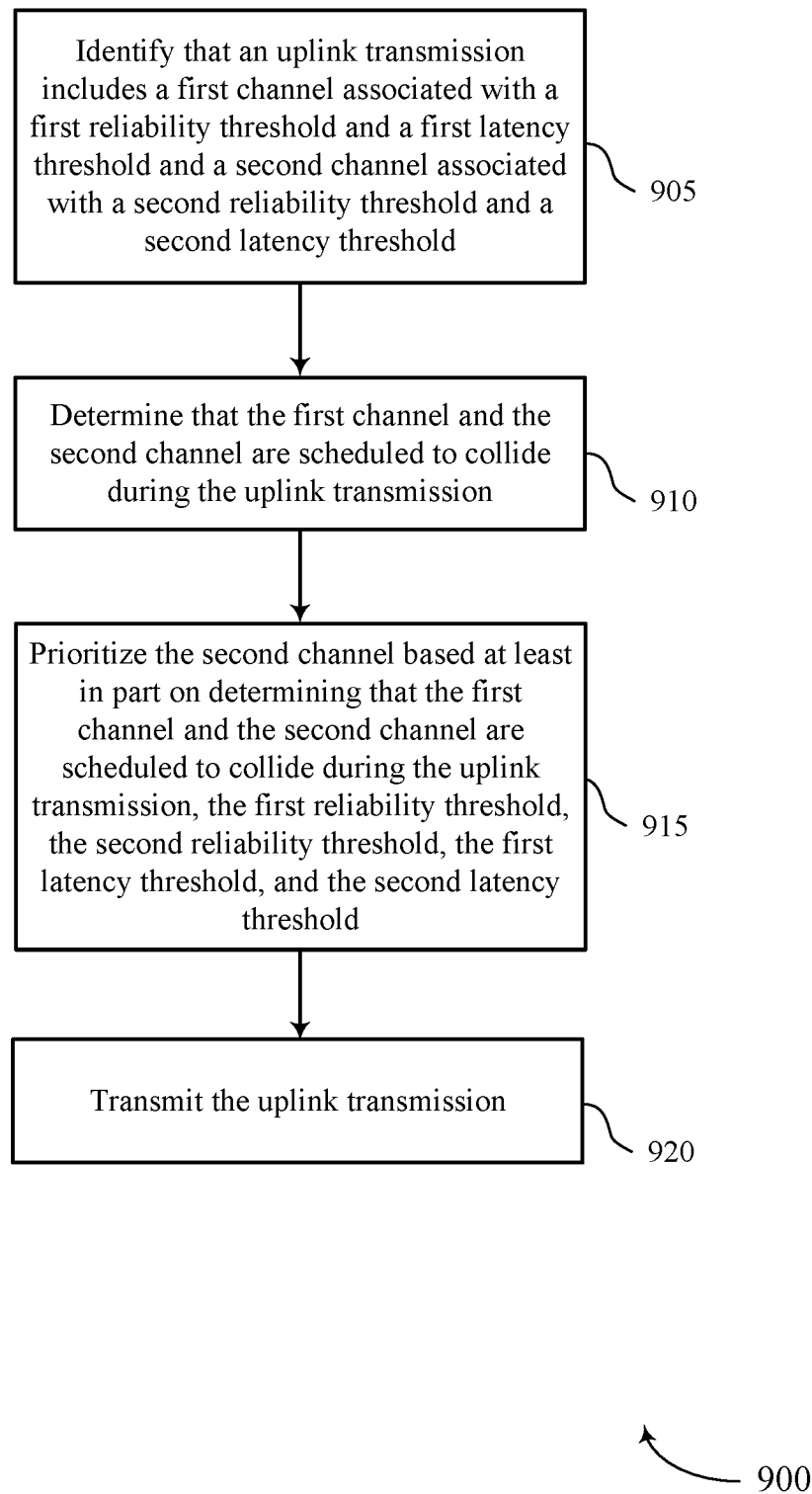
FIGS. 9 through 13 show flowcharts illustrating methods that support uplink collision handling in accordance with aspects of the present disclosure.

FIG. 9 shows a flowchart illustrating a method 900 that supports uplink collision handling in accordance with aspects of the present disclosure. The operations of method 900 may be implemented by a UE 115 or its components as described herein. For example, the operations of method 900 may be performed by a power manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may identify that an uplink transmission includes a first channel associated with a first reliability threshold and a first latency threshold and a second channel associated with a second reliability threshold and a second latency threshold. The operations of 905 may be performed according to the methods described herein. In some examples, aspects of the operations of 905 may be performed by a service type manager as described with reference to FIGS. 5 through 8.

At 910, the UE may determine that the first channel and the second channel are scheduled to collide during the uplink transmission. The operations of 910 may be performed according to the methods described herein. In some examples, aspects of the operations of 910 may be performed by a transmit power manager as described with reference to FIGS. 5 through 8.

At 915, the UE may prioritize the second channel based at least in part on determining that the first channel and the second channel are scheduled to collide during the uplink transmission, the first reliability threshold, the second reliability threshold, the first latency threshold, and the second latency threshold. The operations of 915 may be performed according to the methods described herein. In some examples, aspects of the operations of 915 may be performed by a priority manager as described with reference to FIGS. 5 through 8.

At 920, the UE may transmit the uplink transmission. The operations of 920 may be performed according to the methods described herein. In some examples, aspects of the operations of 920 may be performed by an uplink transmission manager as described with reference to FIGS. 5 through 8.

Figure 10:
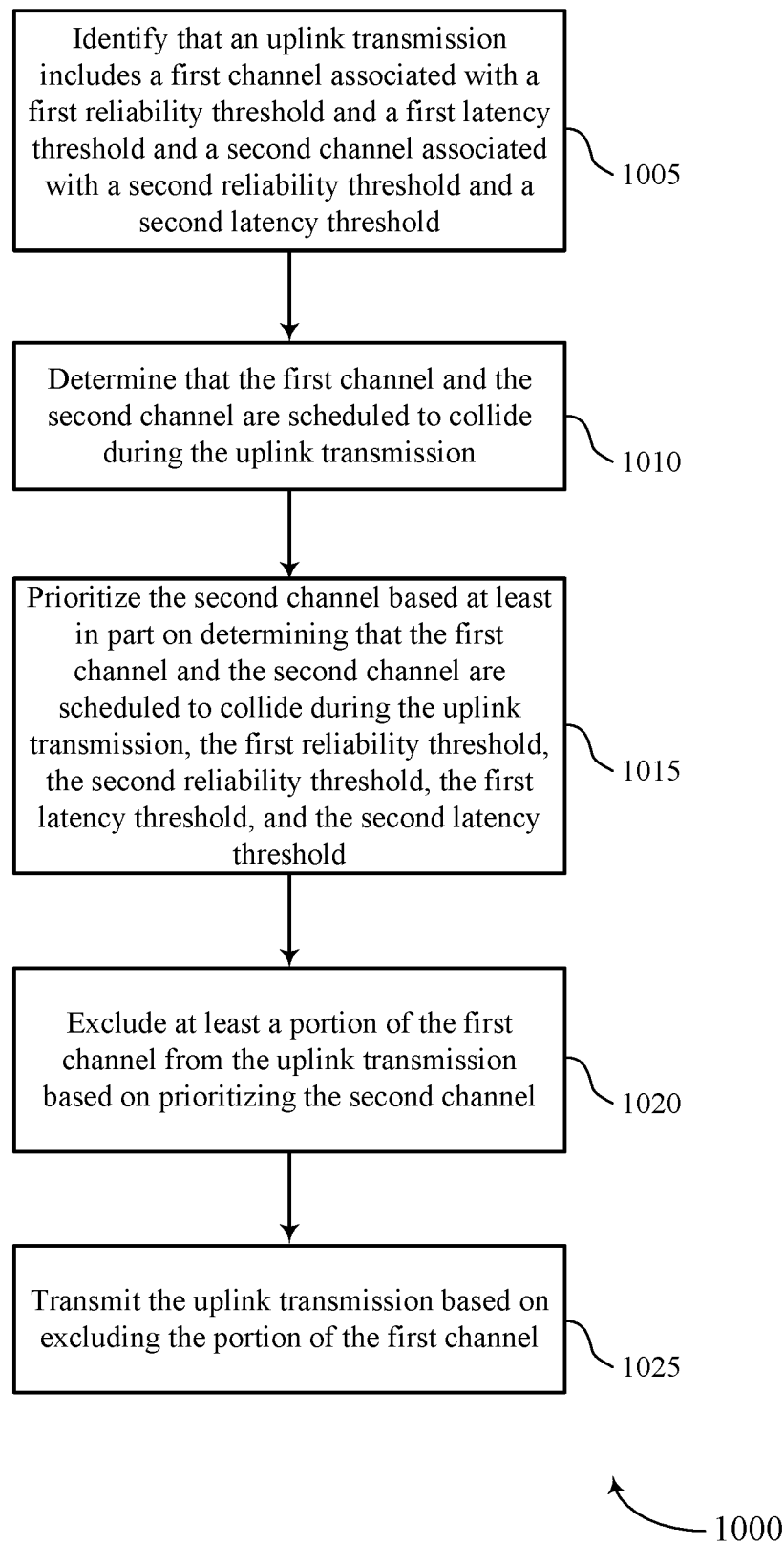

FIG. 10 shows a flowchart illustrating a method 1000 that supports uplink collision handling in accordance with aspects of the present disclosure. The operations of method 1000 may be implemented by a UE 115 or its components as described herein. For example, the operations of method 1000 may be performed by a power manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may identify that an uplink transmission includes a first channel associated with a first reliability threshold and a first latency threshold and a second channel associated with a second reliability threshold and a second latency threshold. The operations of 1005 may be performed according to the methods described herein. In some examples, aspects of the operations of 1005 may be performed by a service type manager as described with reference to FIGS. 5 through 8.

At 1010, the UE may determine that the first channel and the second channel are scheduled to collide during the uplink transmission. The operations of 1010 may be performed according to the methods described herein. In some examples, aspects of the operations of 1010 may be performed by a transmit power manager as described with reference to FIGS. 5 through 8.

At 1015, the UE may prioritize the second channel based at least in part on determining that the first channel and the second channel are scheduled to collide during the uplink transmission, the first reliability threshold, the second reliability threshold, the first latency threshold, and the second latency threshold. The operations of 1015 may be performed according to the methods described herein. In some examples, aspects of the operations of 1015 may be performed by a priority manager as described with reference to FIGS. 5 through 8.

At 1020, the UE may exclude at least a portion of the first channel from the uplink transmission based on prioritizing the second channel. The operations of 1020 may be performed according to the methods described herein. In some examples, aspects of the operations of 1020 may be performed by a dropping manager as described with reference to FIGS. 5 through 8.

At 1025, the UE may transmit the uplink transmission based on excluding the portion of the first channel. The operations of 1025 may be performed according to the methods described herein. In some examples, aspects of the operations of 1025 may be performed by an uplink transmission manager as described with reference to FIGS. 5 through 8.

Figure 11:
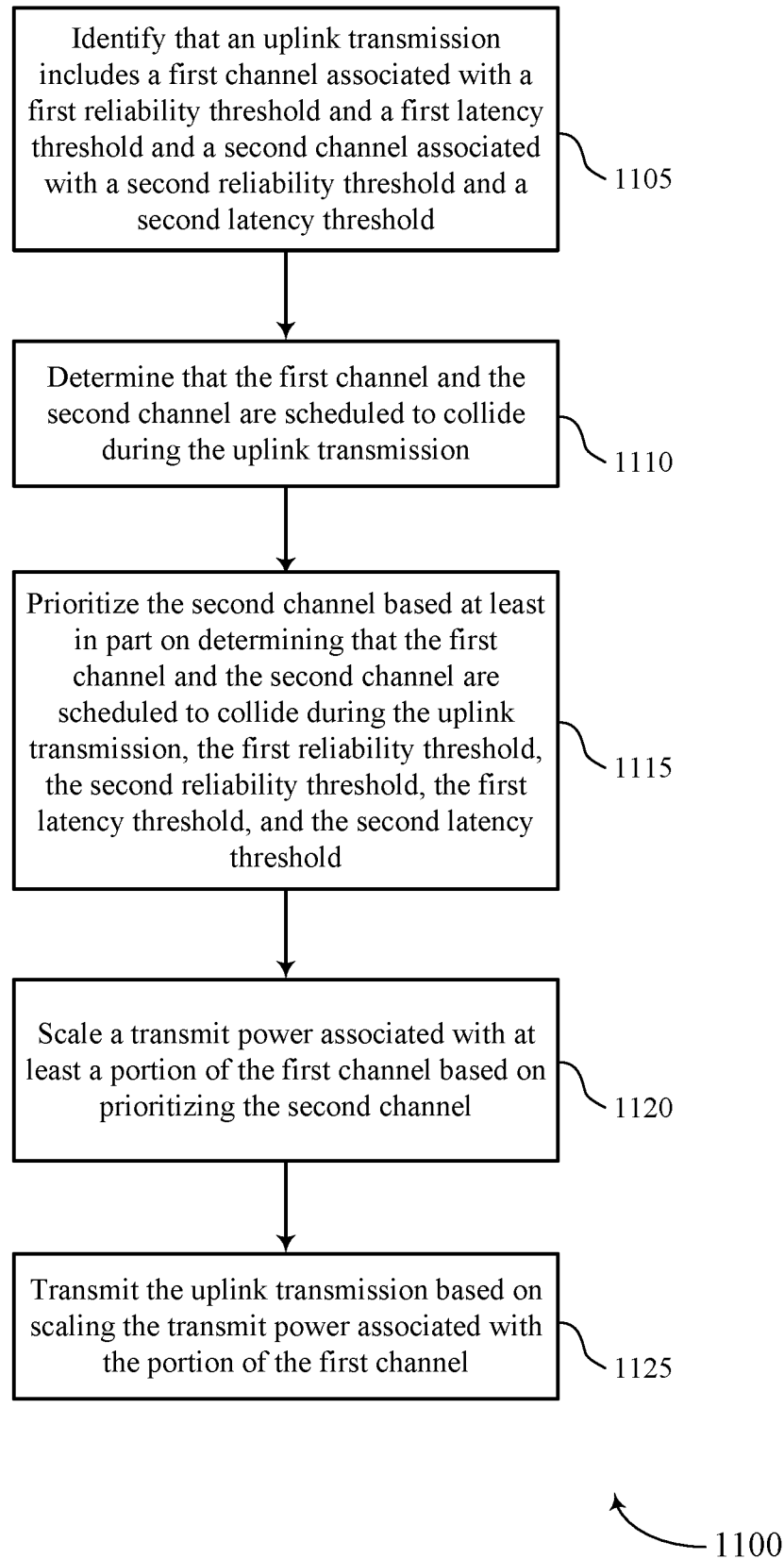

FIG. 11 shows a flowchart illustrating a method 1100 that supports uplink collision handling in accordance with aspects of the present disclosure. The operations of method 1100 may be implemented by a UE 115 or its components as described herein. For example, the operations of method 1100 may be performed by a power manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may identify that an uplink transmission includes a first channel associated with a first reliability threshold and a first latency threshold and a second channel associated with a second reliability threshold and a second latency threshold. The operations of 1105 may be performed according to the methods described herein. In some examples, aspects of the operations of 1105 may be performed by a service type manager as described with reference to FIGS. 5 through 8.

At 1110, the UE may determine that the first channel and the second channel are scheduled to collide during the uplink transmission. The operations of 1110 may be performed according to the methods described herein. In some examples, aspects of the operations of 1110 may be performed by a transmit power manager as described with reference to FIGS. 5 through 8.

At 1115, the UE may prioritize the second channel based at least in part on determining that the first channel and the second channel are scheduled to collide during the uplink transmission, the first reliability threshold, the second reliability threshold, the first latency threshold, and the second latency threshold. The operations of 1115 may be performed according to the methods described herein. In some examples, aspects of the operations of 1115 may be performed by a priority manager as described with reference to FIGS. 5 through 8.

At 1120, the UE may scale a transmit power associated with at least a portion of the first channel based on prioritizing the second channel. The operations of 1120 may be performed according to the methods described herein. In some examples, aspects of the operations of 1120 may be performed by a scaling manager as described with reference to FIGS. 5 through 8.

At 1125, the UE may transmit the uplink transmission based on scaling the transmit power associated with the portion of the first channel. The operations of 1125 may be performed according to the methods described herein. In some examples, aspects of the operations of 1125 may be performed by an uplink transmission manager as described with reference to FIGS. 5 through 8.

Figure 12:
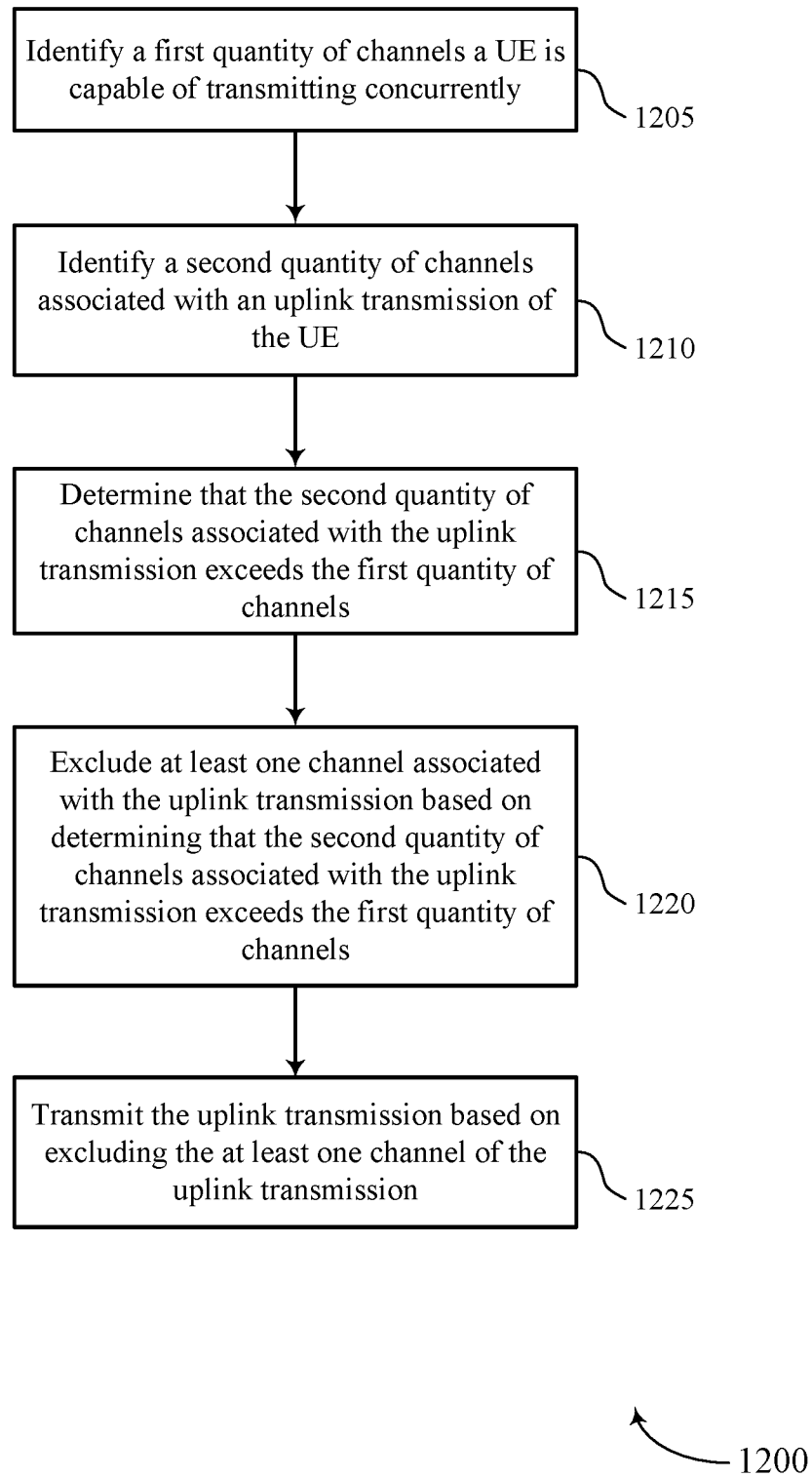

FIG. 12 shows a flowchart illustrating a method 1200 that supports uplink collision handling in accordance with aspects of the present disclosure. The operations of method 1200 may be implemented by a UE 115 or its components as described herein. For example, the operations of method 1200 may be performed by a power manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may identify a first quantity of channels a UE is capable of transmitting concurrently. The operations of 1205 may be performed according to the methods described herein. In some examples, aspects of the operations of 1205 may be performed by a capability manager as described with reference to FIGS. 5 through 8.

At 1210, the UE may identify a second quantity of channels associated with an uplink transmission of the UE. The operations of 1210 may be performed according to the methods described herein. In some examples, aspects of the operations of 1210 may be performed by an uplink transmission manager as described with reference to FIGS. 5 through 8.

At 1215, the UE may determine that the second quantity of channels associated with the uplink transmission exceeds the first quantity of channels. The operations of 1215 may be performed according to the methods described herein. In some examples, aspects of the operations of 1215 may be performed by a capability manager as described with reference to FIGS. 5 through 8.

At 1220, the UE may exclude at least one channel associated with the uplink transmission based on determining that the second quantity of channels associated with the uplink transmission exceeds the first quantity of channels. The operations of 1220 may be performed according to the methods described herein. In some examples, aspects of the operations of 1220 may be performed by a capability manager as described with reference to FIGS. 5 through 8.

At 1225, the UE may transmit the uplink transmission based on excluding the at least one channel of the uplink transmission. The operations of 1225 may be performed according to the methods described herein. In some examples, aspects of the operations of 1225 may be performed by an uplink transmission manager as described with reference to FIGS. 5 through 8.

Figure 13:
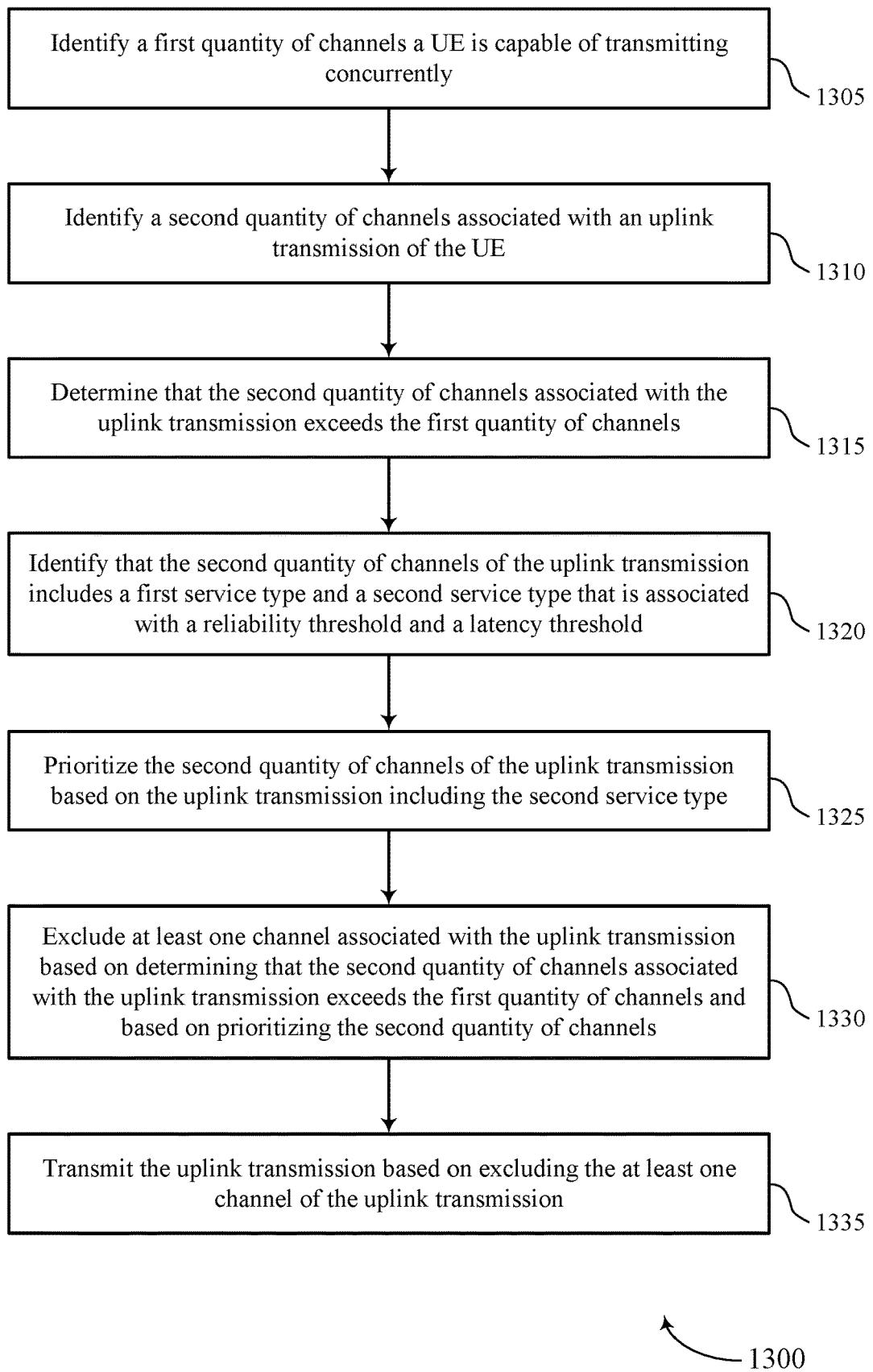

FIG. 13 shows a flowchart illustrating a method 1300 that supports uplink collision handling in accordance with aspects of the present disclosure. The operations of method 1300 may be implemented by a UE 115 or its components as described herein. For example, the operations of method 1300 may be performed by a power manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a first quantity of channels a UE is capable of transmitting concurrently. The operations of 1305 may be performed according to the methods described herein. In some examples, aspects of the operations of 1305 may be performed by a capability manager as described with reference to FIGS. 5 through 8.

At 1310, the UE may identify a second quantity of channels associated with an uplink transmission of the UE. The operations of 1310 may be performed according to the methods described herein. In some examples, aspects of the operations of 1310 may be performed by an uplink transmission manager as described with reference to FIGS. 5 through 8.

At 1315, the UE may determine that the second quantity of channels associated with the uplink transmission exceeds the first quantity of channels. The operations of 1315 may be performed according to the methods described herein. In some examples, aspects of the operations of 1315 may be performed by a capability manager as described with reference to FIGS. 5 through 8.

At 1320, the UE may identify that the second quantity of channels of the uplink transmission includes a first service type and a second service type that is associated with a reliability threshold and a latency threshold. The operations of 1320 may be performed according to the methods described herein. In some examples, aspects of the operations of 1320 may be performed by a priority manager as described with reference to FIGS. 5 through 8.

At 1325, the UE may prioritize the second quantity of channels of the uplink transmission based on the uplink transmission including the second service type. The operations of 1325 may be performed according to the methods described herein. In some examples, aspects of the operations of 1325 may be performed by a priority manager as described with reference to FIGS. 5 through 8.

At 1330, the UE may exclude at least one channel associated with the uplink transmission based on determining that the second quantity of channels associated with the uplink transmission exceeds the first quantity of channels and based on prioritizing the second quantity of channels. The operations of 1330 may be performed according to the methods described herein. In some examples, aspects of the operations of 1330 may be performed by a capability manager as described with reference to FIGS. 5 through 8.

At 1335, the UE may transmit the uplink transmission based on excluding the at least one channel of the uplink transmission. The operations of 1335 may be performed according to the methods described herein. In some examples, aspects of the operations of 1335 may be performed by an uplink transmission manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA, or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying that an uplink transmission includes a first channel associated with a first reliability threshold and a first latency threshold and a second channel associated with a second reliability threshold and a second latency threshold;
determining that the first channel and the second channel are scheduled to collide during the uplink transmission;
prioritizing the second channel based at least in part on determining that the first channel and the second channel are scheduled to collide during the uplink transmission, the first reliability threshold, the second reliability threshold, the first latency threshold, and the second latency threshold;

scaling a transmit power associated with at least a portion of the first channel based at least in part on prioritizing the second channel; and transmitting the uplink transmission based at least in part on scaling the transmit power associated with the portion of the first channel.

2. The method of claim 1, further comprising:
determining that a transmit power of the uplink transmission exceeds a threshold output power of a user equipment (UE), wherein determining that the first channel and the second channel are scheduled to collide is based at least in part on determining that the transmit power exceeds the threshold output power.

3. The method of claim 1, further comprising:
determining that the first channel and the second channel occur on one or more intra-band contiguous component carriers, wherein prioritizing the second channel is based at least in part on determining that the first channel and the second channel occur on the one or more intra-band contiguous component carriers.

4. The method of claim 1, further comprising:
configuring a set of priority rules to indicate whether the first channel has a lower priority than the second channel or the second channel has a lower priority than the first channel, wherein prioritizing the second channel is based at least in part on the set of priority rules.

5. The method of claim 4, wherein the first channel comprises an enhanced mobile broadband (eMBB) channel and the second channel comprises an ultra-reliable low-latency communications (URLLC) channel.

6. The method of claim 1, further comprising:
excluding at least a portion of the first channel from the uplink transmission based at least in part on prioritizing the second channel, wherein transmitting the uplink transmission is based at least in part on excluding the portion of the first channel.

7. The method of claim 1, further comprising:
determining to exclude or scale a transmit power of the first channel in the uplink transmission based at least in part on the prioritizing, wherein transmitting the uplink transmission is based at least in part on determining to exclude or scale the transmit power of the first channel.

8. The method of claim 1, further comprising:
prioritizing the second channel over the first channel based at least in part on the uplink transmission including both the second channel and the first channel, wherein prioritizing the second channel is based at least in part on prioritizing the second channel over the first channel.

9. The method of claim 8, wherein:
all second channels of the uplink transmission are prioritized over all first channels of the uplink transmission.

10. The method of claim 1, further comprising:
determining a first content of the first channel and a second content of the second channel, wherein prioritizing the second channel is based at least in part on determining the first content and the second content.

11. The method of claim 10, further comprising:
prioritizing the first channel over the second channel based at least in part on determining the first content and the second content, wherein prioritizing the second channel is based at least in part on prioritizing the first channel over the second channel.

12. The method of claim 1, further comprising:
determining that the first channel includes a hybrid automatic repeat request (HARQ) acknowledgment (ACK) or negative acknowledgement (NACK); and prioritizing the first channel over the second channel based at least in part on determining that the first channel includes HARQ ACK or NACK, wherein prioritizing the second channel is based at least in part on prioritizing the first channel over the second channel.

13. The method of claim 12, further comprising:
determining that the second channel does not include HARQ ACK or NACK, wherein prioritizing the first channel over the second channel is based at least in part on determining that the second channel does not include HARQ ACK or NACK.

14. The method of claim 1, further comprising:
identifying that the uplink transmission includes a physical random access channel (PRACH); and prioritizing the PRACH over the second channel and the first channel, wherein prioritizing the second channel is based at least in part on prioritizing the PRACH over the second channel and the first channel.

15. The method of claim 14, wherein the PRACH collides with the second channel and the first channel when a scheduling request for a logical channel is not configured with physical uplink control channel (PUCCH) resources or beam failure recovery.

16. The method of claim 14, further comprising:
identifying that the uplink transmission includes the PRACH on a secondary cell; and prioritizing the second channel over the PRACH on the secondary cell, wherein prioritizing the second channel is based at least in part on prioritizing the second channel over the PRACH.

17. The method of claim 1, further comprising:
identifying that the uplink transmission includes a physical random access channel (PRACH); and prioritizing the second channel over the PRACH and the PRACH over the first channel, wherein prioritizing the second channel is based at least in part on prioritizing the second channel over the PRACH and the PRACH over the first channel.

18. The method of claim 1, further comprising:
determining that the first reliability threshold, the second reliability threshold, the first latency threshold, the second latency threshold, or a combination thereof satisfy a criterion; and configuring a user equipment (UE) with a set of prioritization rules based at least in part on based at least in part on the determining that the first reliability threshold, the second reliability threshold, the first latency threshold, the second latency threshold, or the combination thereof satisfy the criterion, wherein prioritizing the second channel is based at least in part on configuring the UE with the set of prioritization rules.

19. The method of claim 1, further comprising:
identifying that the uplink transmission includes a plurality of different physical uplink control channel (PUCCH) groups; and prioritizing a primary PUCCH group over a secondary PUCCH group, wherein prioritizing the second channel is based at least in part on prioritizing the primary PUCCH group over the secondary PUCCH group.

20. The method of claim 1, further comprising:
determining that a transmit power of the uplink transmission exceeds a threshold output power of a user equipment (UE), wherein the threshold output power of the UE is a configured maximum output power.

21. The method of claim 1, wherein the first channel comprises an enhanced mobile broadband (eMBB) channel and the second channel comprises an ultra-reliable low-latency communications (URLLC) channel.

22. A method for wireless communication, comprising:
identifying a first quantity of channels a user equipment (UE) is capable of transmitting concurrently;
identifying a second quantity of channels associated with an uplink transmission of the UE;
determining that the second quantity of channels associated with the uplink transmission exceeds the first quantity of channels;
excluding at least one channel associated with the uplink transmission based at least in part on determining that the second quantity of channels associated with the uplink transmission exceeds the first quantity of channels;
prioritizing a second service type of the uplink transmission that is associated with a reliability threshold and a latency threshold over a first service type, wherein excluding the at least one channel is based at least in part on prioritizing the second service type over the first service type; and
transmitting the uplink transmission based at least in part on excluding the at least one channel of the uplink transmission.

23. The method of claim 22, further comprising:
identifying that the second quantity of channels of the uplink transmission includes the first service type and the second service type that is associated with the reliability threshold and the latency threshold; and
prioritizing the second quantity of channels of the uplink transmission based at least in part on the uplink transmission including the second service type, wherein excluding the at least one channel is based at least in part on prioritizing the second quantity of channels.

24. The method of claim 22, wherein the first quantity of channels and the second quantity of channels are identified for each physical uplink control channel (PUCCH) group associated with the UE.

25. The method of claim 22, wherein the first quantity of channels is defined across all uplink carriers associated with the UE.

26. The method of claim 22, further comprising:
determining that the first service type includes a hybrid automatic repeat request (HARQ) acknowledgment (ACK) or negative acknowledgement (NACK); and
prioritizing the first service type over the second service type that is associated with the reliability threshold and the latency threshold based at least in part on determining that the first service type includes HARQ ACK/NACK, wherein excluding the at least one channel is based at least in part on prioritizing the first service type over the second service type.

27. An apparatus for wireless communication, comprising:
a processor,
memory in electronic communication with the processor; and
instructions stored in the memory and executable by the processor to cause the apparatus to:
identify that an uplink transmission includes a first service type and a second service type that is associated with a reliability threshold and a latency threshold;
determine that a transmit power of the uplink transmission exceeds a threshold output power of a user equipment (UE);
prioritize the second service type based at least in part on determining that the transmit power exceeds the threshold output power, the reliability threshold, and the latency threshold;
scale a transmit power associated with at least a portion of the first service type based at least in part on prioritizing the second second service type; and
transmit the uplink transmission based at least in part on scaling the transmit power associated with the portion of the first service type.

28. An apparatus for wireless communication, comprising:
a processor,
memory in electronic communication with the processor; and
instructions stored in the memory and executable by the processor to cause the apparatus to:
identify a first quantity of channels a user equipment (UE) is capable of transmitting concurrently;
identify a second quantity of channels associated with an uplink transmission of the UE; determine that the second quantity of channels associated with the uplink transmission exceeds the first quantity of channels;
exclude at least one channel associated with the uplink transmission based at least in part on determining that the second quantity of channels associated with the uplink transmission exceeds the first quantity of channels;
prioritize a second service type of the uplink transmission that is associated with a reliability threshold and a latency threshold over a first service type, wherein excluding the at least one channel is based at least in part on prioritizing the second service type over the first service type; and
transmit the uplink transmission based at least in part on excluding the at least one channel of the uplink transmission.

* * * * *